United States Patent
Park et al.

(10) Patent No.: US 12,200,518 B2
(45) Date of Patent: Jan. 14, 2025

(54) SIGNAL TRANSMITTING AND RECEIVING METHOD IN WIRELESS COMMUNICATION SYSTEM

(71) Applicant: LG ELECTRONICS INC., Seoul (KR)

(72) Inventors: Giwon Park, Seoul (KR); Youngdae Lee, Seoul (KR); Hanbyul Seo, Seoul (KR); Jongyoul Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 281 days.

(21) Appl. No.: 17/596,259

(22) PCT Filed: Jul. 13, 2020

(86) PCT No.: PCT/KR2020/009197
§ 371 (c)(1),
(2) Date: Dec. 6, 2021

(87) PCT Pub. No.: WO2021/010708
PCT Pub. Date: Jan. 21, 2021

(65) Prior Publication Data
US 2022/0225136 A1    Jul. 14, 2022

(30) Foreign Application Priority Data

Jul. 12, 2019 (KR) .................. 10-2019-0084355
Jul. 17, 2019 (KR) .................. 10-2019-0086514
Jul. 23, 2019 (KR) .................. 10-2019-0088951

(51) Int. Cl.
*H04W 24/08* (2009.01)
*H04W 24/10* (2009.01)

(52) U.S. Cl.
CPC .......... *H04W 24/08* (2013.01); *H04W 24/10* (2013.01)

(58) Field of Classification Search
None
See application file for complete search history.

(56) References Cited

U.S. PATENT DOCUMENTS 9,986,447 B2 * 5/2018 Heo .................. H04L 1/1887
10,349,389 B2 * 7/2019 Jung .................. H04W 72/23
2017/0280486 A1 9/2017 Lee et al.

OTHER PUBLICATIONS

Samsung, et al., "On Sidelink RLM," 3GPP TSG-RAN WG1 #96bis, R1-1904430, Apr. 2019, 5 pages.
(Continued)

*Primary Examiner* — Chi H Pham
*Assistant Examiner* — Raul Rivas
(74) *Attorney, Agent, or Firm* — LEE, HONG, DEGERMAN, KANG & WAIMEY

(57) ABSTRACT

An embodiment relates to a method for performing an operation for a first terminal in a wireless communication system, the method comprising the steps of: performing, by the first terminal, radio link monitoring of a second terminal; detecting a radio link failure (RLF) on the basis of the radio link monitoring; and after detecting the RLF, transmitting a signal to the second terminal, wherein the first terminal transmits, to a base station on the basis of the detection of the RLF, a sidelink measurement report including a measurement value of a radio link with the second terminal, and the signal is transmitted by applying a transmission parameter reconfigured on the basis of the sidelink measurement report.

10 Claims, 29 Drawing Sheets

(56) References Cited

OTHER PUBLICATIONS

Huawei, et al., "Sidelink physical layer procedures for NR V2X," 3GPP TSG-RAN WG1 #96bis, R1-1903944, Apr. 2019, 19 pages.
Catt, et al., "RLM/RLF declaration in NR V2X Sidelink," 3GPP TSG-RAN WG1 #105bis, R2-1903179, Mar. 2019, 4 pages.
LG Electronics, et al., "Discussion on transmitter UE side RLM and RLF in NR SL," 3GPP TSG-RAN WG1 #105bis, R2-1904223, Mar. 2019, 5 pages.
PCT International Application No. PCT/KR2020/009197, International Search Report dated Oct. 29, 2020, 6 pages.

\* cited by examiner

FIG. 8
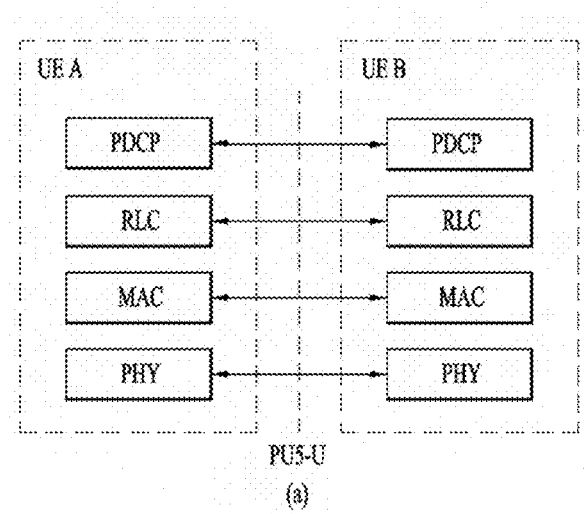
(a)
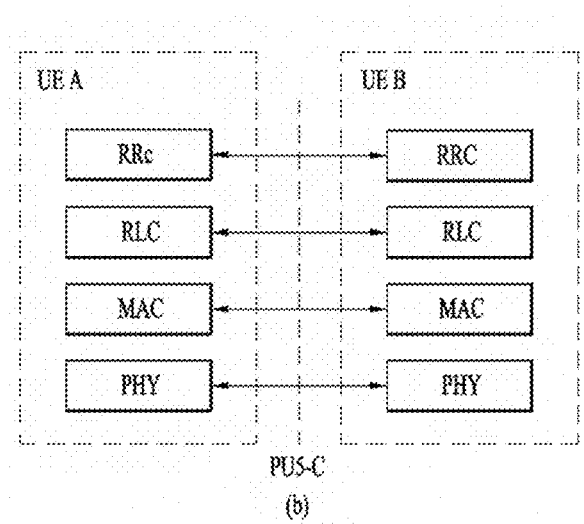
(b)

FIG. 9
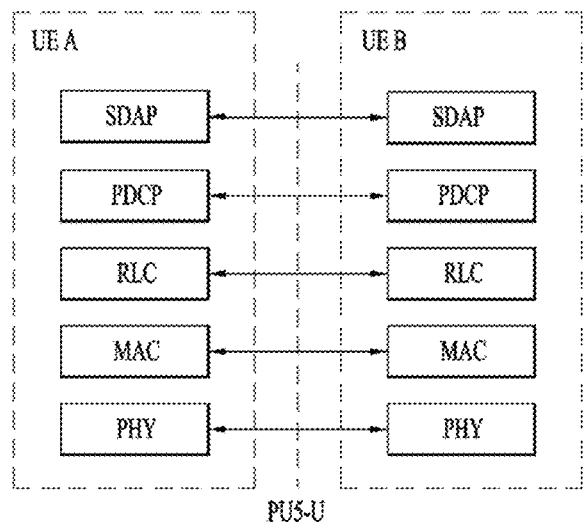
(a)
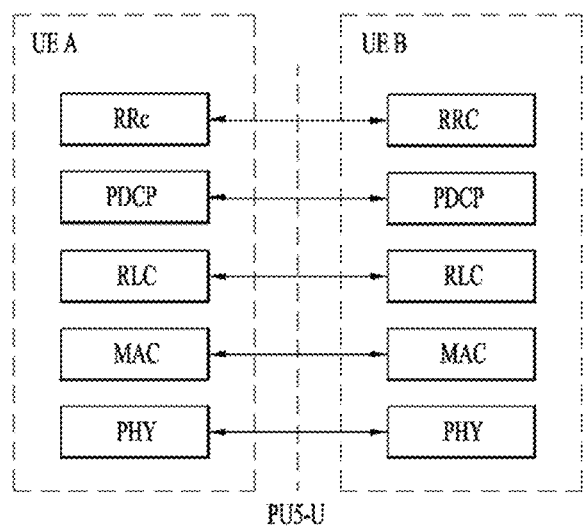
(b)

SIGNAL TRANSMITTING AND RECEIVING METHOD IN WIRELESS COMMUNICATION SYSTEM

CROSS-REFERENCE TO RELATED APPLICATIONS

This application is the National Stage filing under 35 U.S.C. 371 of International Application No. PCT/KR2020/009197, filed on Jul. 13, 2020, which claims the benefit of earlier filing date and right of priority to Korean Application Nos. 10-2019-0084355, filed on Jul. 12, 2019, 10-2019-0086514, filed on Jul. 17, 2019, and 10-2019-0088951, filed on Jul. 23, 2019, the contents of which are all incorporated by reference herein in their entirety.

TECHNICAL FIELD

The following description relates to a wireless communication system, and more particularly, to a method and apparatus related to signal transmission of a sidelink user equipment (UE), when radio link failure (RLF) of a sidelink connection is detected.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A wireless communication system uses various radio access technologies (RATs) such as long term evolution (LTE), LTE-advanced (LTE-A), and wireless fidelity (WiFi). 5th generation (5G) is such a wireless communication system. Three key requirement areas of 5G include (1) enhanced mobile broadband (eMBB), (2) massive machine type communication (mMTC), and (3) ultra-reliable and low latency communications (URLLC). Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is augmented reality (AR) for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable location information.

A wireless communication system is a multiple access system that supports communication of multiple users by sharing available system resources (a bandwidth, transmission power, etc.). Examples of multiple access systems include a CDMA system, an FDMA system, a TDMA system, an OFDMA system, an SC-FDMA system, and an MC-FDMA system.

Sidelink (SL) refers to a communication scheme in which a direct link is established between user equipments (UEs) and the UEs directly exchange voice or data without intervention of a base station (BS). SL is considered as a solution of relieving the BS of the constraint of rapidly growing data traffic.

Vehicle-to-everything (V2X) is a communication technology in which a vehicle exchanges information with another vehicle, a pedestrian, and infrastructure by wired/wireless communication. V2X may be categorized into four types: vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

As more and more communication devices demand larger communication capacities, there is a need for enhanced mobile broadband communication relative to existing RATs. Accordingly, a communication system is under discussion, for which services or UEs sensitive to reliability and latency are considered. The next-generation RAT in which eMBB, MTC, and URLLC are considered is referred to as new RAT or NR. In NR, V2X communication may also be supported.

FIG. 1 is a diagram illustrating V2X communication based on pre-NR RAT and V2X communication based on NR in comparison.

For V2X communication, a technique of providing safety service based on V2X messages such as basic safety message (BSM), cooperative awareness message (CAM), and decentralized environmental notification message (DENM) was mainly discussed in the pre-NR RAT. The V2X message may include location information, dynamic information, and attribute information. For example, a UE may transmit a CAM of a periodic message type and/or a DENM of an event-triggered type to another UE.

For example, the CAM may include basic vehicle information including dynamic state information such as a direction and a speed, vehicle static data such as dimensions, an external lighting state, path details, and so on. For example, the UE may broadcast the CAM which may have a latency less than 100 ms. For example, when an unexpected incident occurs, such as breakage or an accident of a vehicle, the UE may generate the DENM and transmit the DENM to another UE. For example, all vehicles within the transmission range of the UE may receive the CAM and/or the DENM. In this case, the DENM may have priority over the CAM.

In relation to V2X communication, various V2X scenarios are presented in NR. For example, the V2X scenarios include vehicle platooning, advanced driving, extended sensors, and remote driving.

For example, vehicles may be dynamically grouped and travel together based on vehicle platooning. For example, to perform platoon operations based on vehicle platooning, the vehicles of the group may receive periodic data from a leading vehicle. For example, the vehicles of the group may widen or narrow their gaps based on the periodic data.

For example, a vehicle may be semi-automated or full-automated based on advanced driving. For example, each vehicle may adjust a trajectory or maneuvering based on data obtained from a nearby vehicle and/or a nearby logical entity. For example, each vehicle may also share a dividing intention with nearby vehicles.

Based on extended sensors, for example, raw or processed data obtained through local sensor or live video data may be exchanged between vehicles, logical entities, terminals of pedestrians and/or V2X application servers. Accordingly, a vehicle may perceive an advanced environment relative to an environment perceivable by its sensor.

Based on remote driving, for example, a remote driver or a V2X application may operate or control a remote vehicle on behalf of a person incapable of driving or in a dangerous environment. For example, when a path may be predicted as in public transportation, cloud computing-based driving may be used in operating or controlling the remote vehicle. For example, access to a cloud-based back-end service platform may also be used for remote driving.

A scheme of specifying service requirements for various V2X scenarios including vehicle platooning, advanced driving, extended sensors, and remote driving is under discussion in NR-based V2X communication.

DISCLOSURE

Technical Problem

Embodiment(s) is intended to address how to transmit a sidelink signal to prevent radio link failure (RLF) declaration, when RLF is detected.

Embodiment(s) is intended to address how to perform radio link monitoring, when a radio link is recovered after RLF detection.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

According to an embodiment, a method of performing an operation for a first user equipment (UE) in a wireless communication system includes performing radio link monitoring with a second UE by the first UE, detecting radio link failure (RLF) based on the radio link monitoring, and transmitting a signal to the second UE after the RLF detection. The first UE transmits a sidelink measurement report including a radio link measurement value with the second UE to a base station based on the RLF detection, and the signal is transmitted by applying a transmission parameter reconfigured based on the sidelink measurement report.

According to an embodiment, a first UE in a wireless communication system includes at least one processor, and at least one computer memory operably coupled to the at least one processor and storing instructions which when executed, cause the at least one processor to perform operations. The operations include performing radio link monitoring with a second UE by the first UE, detecting RLF based on the radio link monitoring, and transmitting a signal to the second UE after the RLF detection. The first UE transmits a sidelink measurement report including a radio link measurement value with the second UE to a base station based on the RLF detection, and the signal is transmitted by applying a transmission parameter reconfigured based on the sidelink measurement report.

According to an embodiment, a processor for performing operations for a first UE in a wireless communication system is provided. The operations include performing radio link monitoring with a second UE by the first UE, detecting RLF based on the radio link monitoring, and transmitting a signal to the second UE after the RLF detection. The first UE transmits a sidelink measurement report including a radio link measurement value with the second UE to a base station based on the RLF detection, and the signal is transmitted by applying a transmission parameter reconfigured based on the sidelink measurement report.

According to an embodiment, a computer-readable storage medium storing at least one program including instructions which when executed by at least one processor, causes the at least one processor to perform operations is provided. The operations include performing radio link monitoring with a second UE by the first UE, detecting RLF based on the radio link monitoring, and transmitting a signal to the second UE after the RLF detection. The first UE transmits a sidelink measurement report including a radio link measurement value with the second UE to a base station based on the RLF detection, and the signal is transmitted by applying a transmission parameter reconfigured based on the sidelink measurement report.

The operations may further include receiving information about the transmission parameter from the base station.

The transmission parameter may include at least one of a modulation and coding scheme (MCS) level, a received power value of the second UE, a pathloss compensation factor, or a maximum transmission power.

The operations may further include, based on the first UE operating in resource allocation mode 2, being reconfigured with a resource pool by the base station after the RLF detection.

The signal may be transmitted in resources selected from the resource pool.

The sidelink measurement report may be received from the second UE or measured by the first UE.

The operations may further include starting an RLF timer based on the RLF detection, and based on a radio link being recovered before expiration of the RLF timer, a reconfigured radio link monitoring parameter may be received from the base station.

The radio link monitoring parameter may include at least one of an RLF timer duration, an out-of-sync count, an in-sync count, a target block error rate (BLER), a maximum number of radio link control protocol data unit (RLC PDU) retransmissions, a maximum number of hybrid automatic repeat request (HARQ) negative acknowledgement (NACK) feedback receptions, or a maximum number of no feedback receptions.

The first UE may communicate with at least one of another UE, a UE related to an autonomous driving vehicle, a base station, or a network.

Advantageous Effects

According to an embodiment, a signal is transmitted by applying a retransmission parameter and a modulation and coding scheme (MCS) level reconfigured by a base station (BS) to prevent radio link failure (RLF) declaration.

According to an embodiment, when a radio link is recovered after RLF declaration, radio link monitoring may be performed adaptively according to a radio link state.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure, provide embodiments of the present disclosure together with detail explanation.

FIG. 8 is a diagram illustrating radio protocol architectures for sidelink (SL) communication according to an embodiment of the present disclosure;

FIG. 9 is a diagram illustrating radio protocol architectures for SL communication according to an embodiment of the present disclosure;

BEST MODE

In various embodiments of the present disclosure, "/" and "," should be interpreted as "and/or". For example, "A/B" may mean "A and/or B". Further, "A, B" may mean "A and/or B". Further, "A/B/C" may mean "at least one of A, B and/or C". Further, "A, B, C" may mean "at least one of A, B and/or C".

In various embodiments of the present disclosure, "or" should be interpreted as "and/or". For example, "A or B" may include "only A", "only B", and/or "both A and B". In other words, "or" should be interpreted as "additionally or alternatively".

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA), or the like. IEEE 802.16m is an evolution of IEEE 802.16e, offering backward compatibility with an IRRR 802.16e-based system. UTRA is a part of universal mobile telecommunications system (UMTS). 3rd generation partnership project (3GPP) long term evolution (LTE) is a part of evolved UMTS (E-UMTS) using evolved UTRA (E-UTRA). 3GPP LTE employs OFDMA for downlink (DL) and SC-FDMA for uplink (UL). LTE-advanced (LTE-A) is an evolution of 3GPP LTE.

A successor to LTE-A, 5th generation (5G) new radio access technology (NR) is a new clean-state mobile communication system characterized by high performance, low latency, and high availability. 5G NR may use all available spectral resources including a low frequency band below 1 GHz, an intermediate frequency band between 1 GHz and 10 GHz, and a high frequency (millimeter) band of 24 GHz or above.

While the following description is given mainly in the context of LTE-A or 5G NR for the clarity of description, the technical idea of an embodiment of the present disclosure is not limited thereto.

Figure 1:
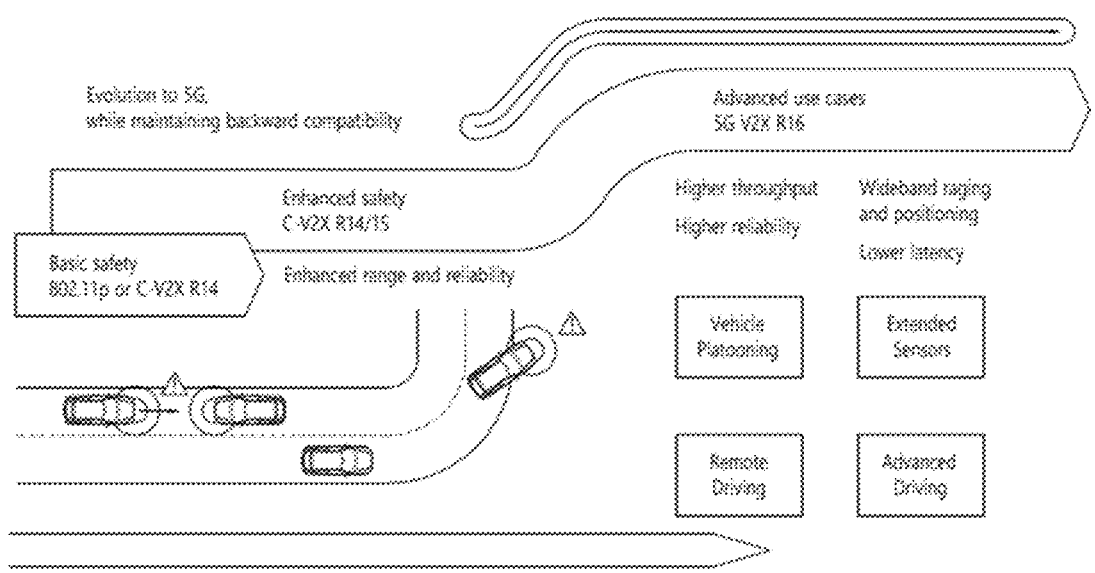
FIG. 1 is a diagram illustrating vehicle-to-everything (V2X) communication based on pre-new radio access technology (NR) RAT and V2X communication based on NR in comparison.
Figure 2:
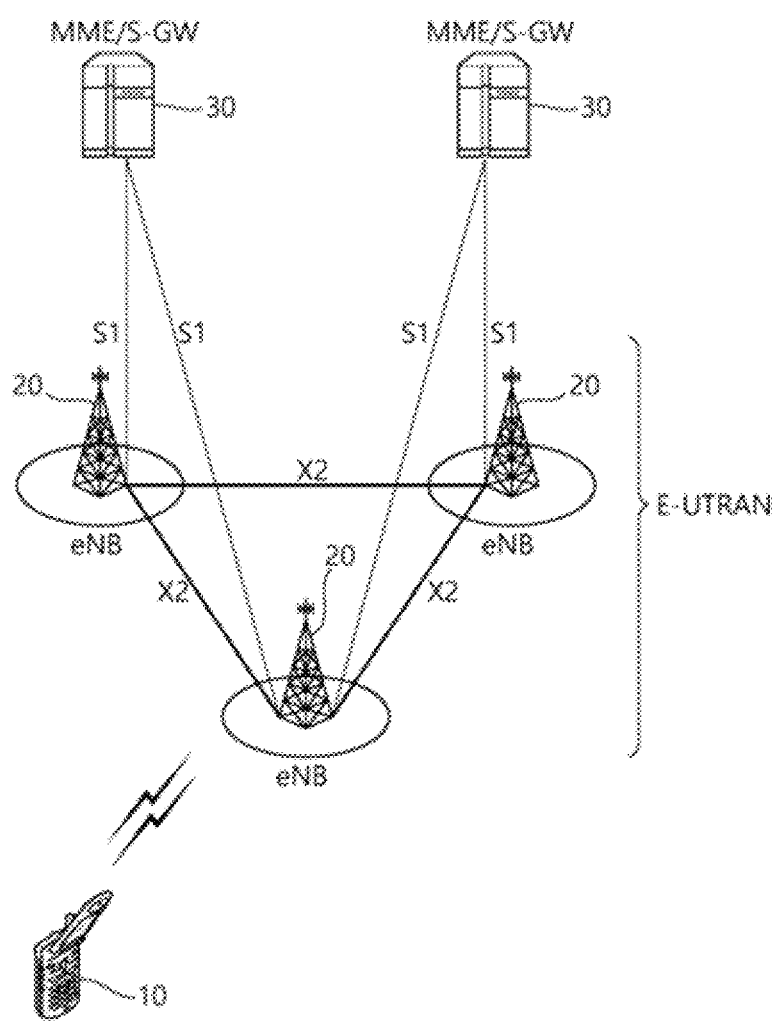
FIG. 2 is a diagram illustrating the structure of a long term evolution (LTE) system according to an embodiment of the present disclosure.

FIG. 2 illustrates the structure of an LTE system according to an embodiment of the present disclosure. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
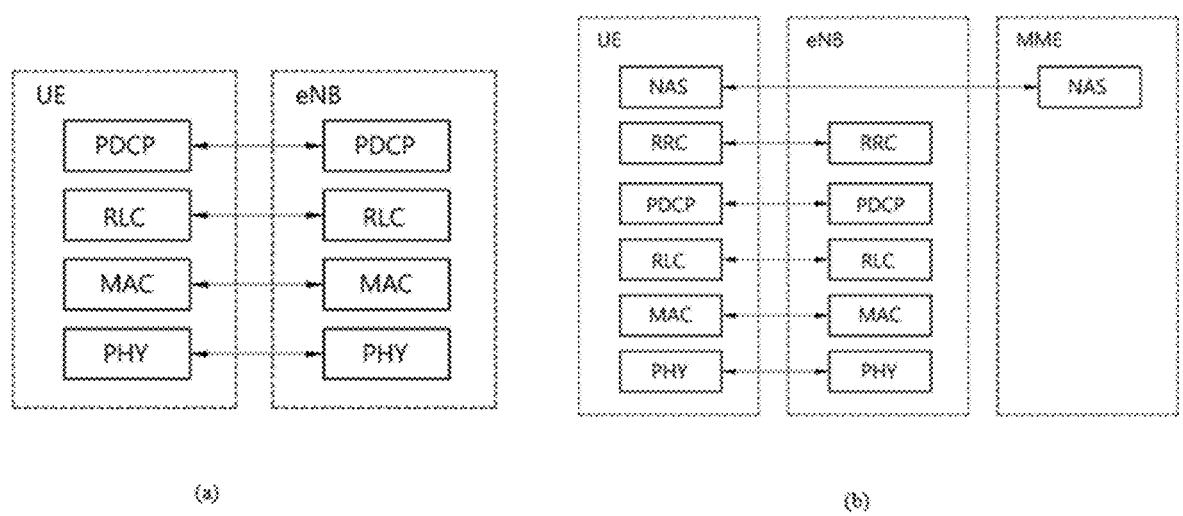
FIG. 3 is a diagram illustrating user-plane and control-plane radio protocol architectures according to an embodiment of the present disclosure.

FIG. 3(*a*) illustrates a user-plane radio protocol architecture according to an embodiment of the disclosure.

FIG. 3(*b*) illustrates a control-plane radio protocol architecture according to an embodiment of the disclosure. A user plane is a protocol stack for user data transmission, and a control plane is a protocol stack for control signal transmission.

Referring to FIG. 3(a) and A3, the PHY layer provides an information transfer service to its higher layer on physical channels. The PHY layer is connected to the medium access control (MAC) layer through transport channels and data is transferred between the MAC layer and the PHY layer on the transport channels. The transport channels are divided according to features with which data is transmitted via a radio interface.

Data is transmitted on physical channels between different PHY layers, that is, the PHY layers of a transmitter and a receiver. The physical channels may be modulated in orthogonal frequency division multiplexing (OFDM) and use time and frequencies as radio resources.

The MAC layer provides services to a higher layer, radio link control (RLC) on logical channels. The MAC layer provides a function of mapping from a plurality of logical channels to a plurality of transport channels. Further, the MAC layer provides a logical channel multiplexing function by mapping a plurality of logical channels to a single transport channel. A MAC sublayer provides a data transmission service on the logical channels.

The RLC layer performs concatenation, segmentation, and reassembly for RLC serving data units (SDUs). In order to guarantee various quality of service (QoS) requirements of each radio bearer (RB), the RLC layer provides three operation modes, transparent mode (TM), unacknowledged mode (UM), and acknowledged Mode (AM). An AM RLC provides error correction through automatic repeat request (ARQ).

The RRC layer is defined only in the control plane and controls logical channels, transport channels, and physical channels in relation to configuration, reconfiguration, and release of RBs. An RB refers to a logical path provided by L1 (the PHY layer) and L2 (the MAC layer, the RLC layer, and the packet data convergence protocol (PDCP) layer), for data transmission between the UE and the network.

The user-plane functions of the PDCP layer include user data transmission, header compression, and ciphering. The control-plane functions of the PDCP layer include control-plane data transmission and ciphering/integrity protection.

RB establishment amounts to a process of defining radio protocol layers and channel features and configuring specific parameters and operation methods in order to provide a specific service. RBs may be classified into two types, signaling radio bearer (SRB) and data radio bearer (DRB). The SRB is used as a path in which an RRC message is transmitted on the control plane, whereas the DRB is used as a path in which user data is transmitted on the user plane.

Once an RRC connection is established between the RRC layer of the UE and the RRC layer of the E-UTRAN, the UE is placed in RRC_CONNECTED state, and otherwise, the UE is placed in RRC_IDLE state. In NR, RRC_INACTIVE state is additionally defined. A UE in the RRC_INACTIVE state may maintain a connection to a core network, while releasing a connection from an eNB.

DL transport channels carrying data from the network to the UE include a broadcast channel (BCH) on which system information is transmitted and a DL shared channel (DL SCH) on which user traffic or a control message is transmitted. Traffic or a control message of a DL multicast or broadcast service may be transmitted on the DL-SCH or a DL multicast channel (DL MCH). UL transport channels carrying data from the UE to the network include a random access channel (RACH) on which an initial control message is transmitted and an UL shared channel (UL SCH) on which user traffic or a control message is transmitted.

The logical channels which are above and mapped to the transport channels include a broadcast control channel (BCCH), a paging control channel (PCCH), a common control channel (CCCH), a multicast control channel (MCCH), and a multicast traffic channel (MTCH).

A physical channel includes a plurality of OFDM symbol in the time domain by a plurality of subcarriers in the frequency domain. One subframe includes a plurality of OFDM symbols in the time domain. An RB is a resource allocation unit defined by a plurality of OFDM symbols by a plurality of subcarriers. Further, each subframe may use specific subcarriers of specific OFDM symbols (e.g., the first OFDM symbol) in a corresponding subframe for a physical DL control channel (PDCCH), that is, an L1/L2 control channel. A transmission time interval (TTI) is a unit time for subframe transmission.

Figure 4:
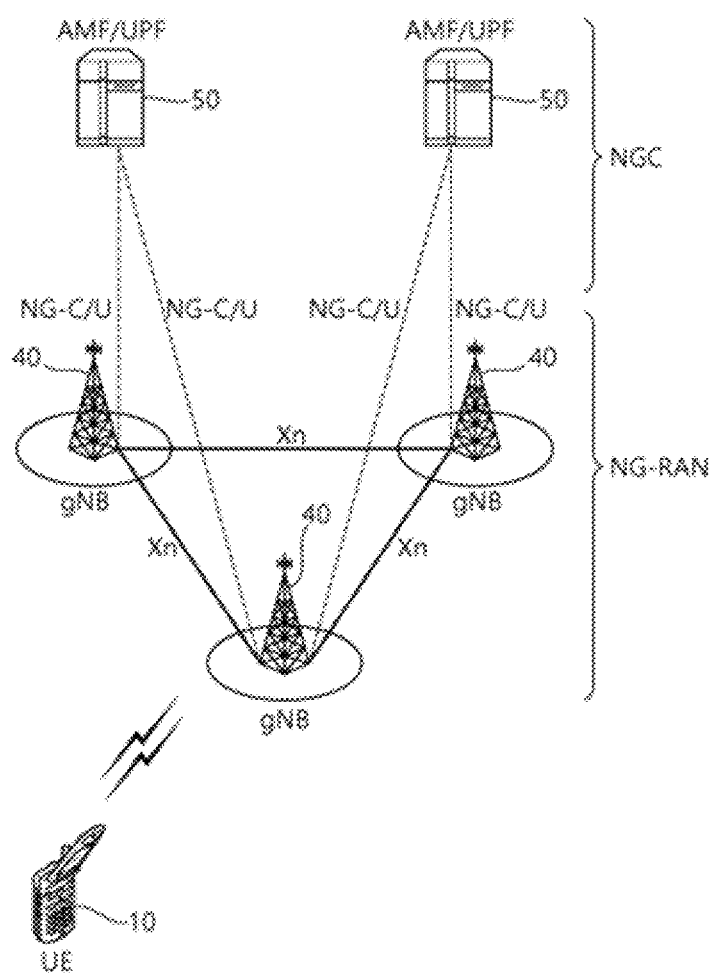
FIG. 4 is a diagram illustrating the structure of an NR system according to an embodiment of the present disclosure.

FIG. 4 illustrates the structure of an NR system according to an embodiment of the present disclosure.

Referring to FIG. 4, a next generation radio access network (NG-RAN) may include a next generation Node B (gNB) and/or an eNB, which provides user-plane and control-plane protocol termination to a UE. In FIG. 4, the NG-RAN is shown as including only gNB s, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 5:
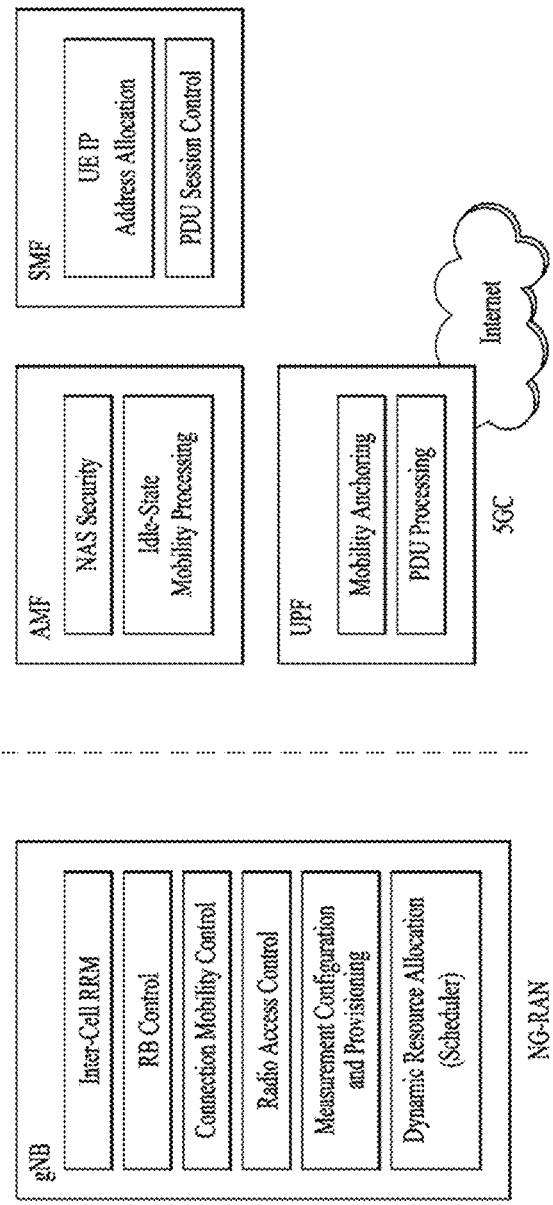
FIG. 5 is a diagram illustrating functional split between a next generation radio access network (NG-RAN) and a 5th generation core network (5GC) according to an embodiment of the present disclosure.

FIG. 5 illustrates functional split between the NG-RAN and the 5GC according to an embodiment of the present disclosure.

Referring to FIG. 5, a gNB may provide functions including inter-cell radio resource management (RRM), radio admission control, measurement configuration and provision, and dynamic resource allocation. The AMF may provide functions such as non-access stratum (NAS) security and idle-state mobility processing. The UPF may provide functions including mobility anchoring and protocol data unit (PDU) processing. A session management function (SMF) may provide functions including UE Internet protocol (IP) address allocation and PDU session control.

Figure 6:
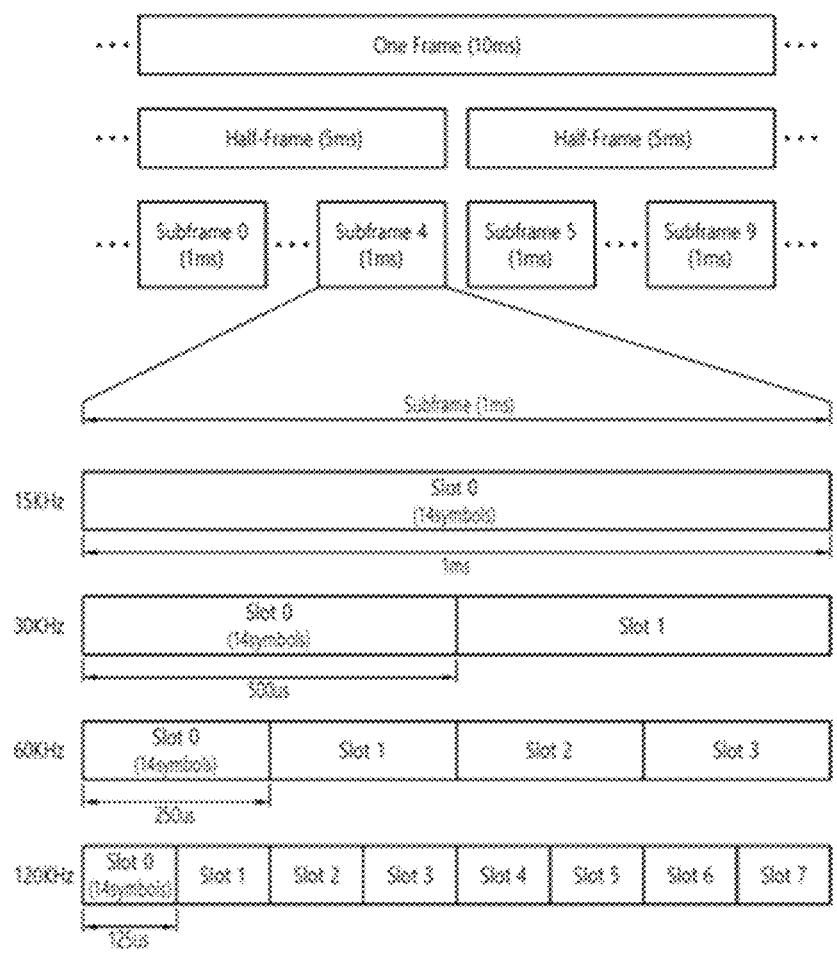
FIG. 6 is a diagram illustrating the structure of an NR radio frame to which embodiment(s) of the present disclosure is applicable.

FIG. 6 illustrates a radio frame structure in NR, to which embodiment(s) of the present disclosure is applicable.

Referring to FIG. 6, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N^{slot}_{symb}$, the number of slots per frame $N^{frame,\mu}_{slot}$, and the number of slots per subframe $N^{subframe,\mu}_{slot}$ according to an SCS configuration μ in the NCP case.

TABLE 1

| SCS (15*2u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource including the same number of symbols (e.g., a subframe, slot, or TTI) (collectively referred to as a time unit (TU) for convenience) may be configured to be different for the aggregated cells.

In NR, various numerologies or SCSs may be supported to support various 5G services. For example, with an SCS of 15 kHz, a wide area in traditional cellular bands may be supported, while with an SCS of 30 kHz/60 kHz, a dense urban area, a lower latency, and a wide carrier bandwidth may be supported. With an SCS of 60 kHz or higher, a bandwidth larger than 24.25 GHz may be supported to overcome phase noise.

An NR frequency band may be defined by two types of frequency ranges, FR1 and FR2. The numerals in each frequency range may be changed. For example, the two types of frequency ranges may be given in [Table 3]. In the NR system, FR1 may be a "sub 6 GHz range" and FR2 may be an "above 6 GHz range" called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerals in a frequency range may be changed in the NR system. For example, FR1 may range from 410 MHz to 7125 MHz as listed in [Table 4]. That is, FR1 may include a frequency band of 6 GHz (or 5850, 5900, and 5925 MHz) or above. For example, the frequency band of 6 GHz (or 5850, 5900, and 5925 MHz) or above may include an unlicensed band. The unlicensed band may be used for various purposes, for example, vehicle communication (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 7:
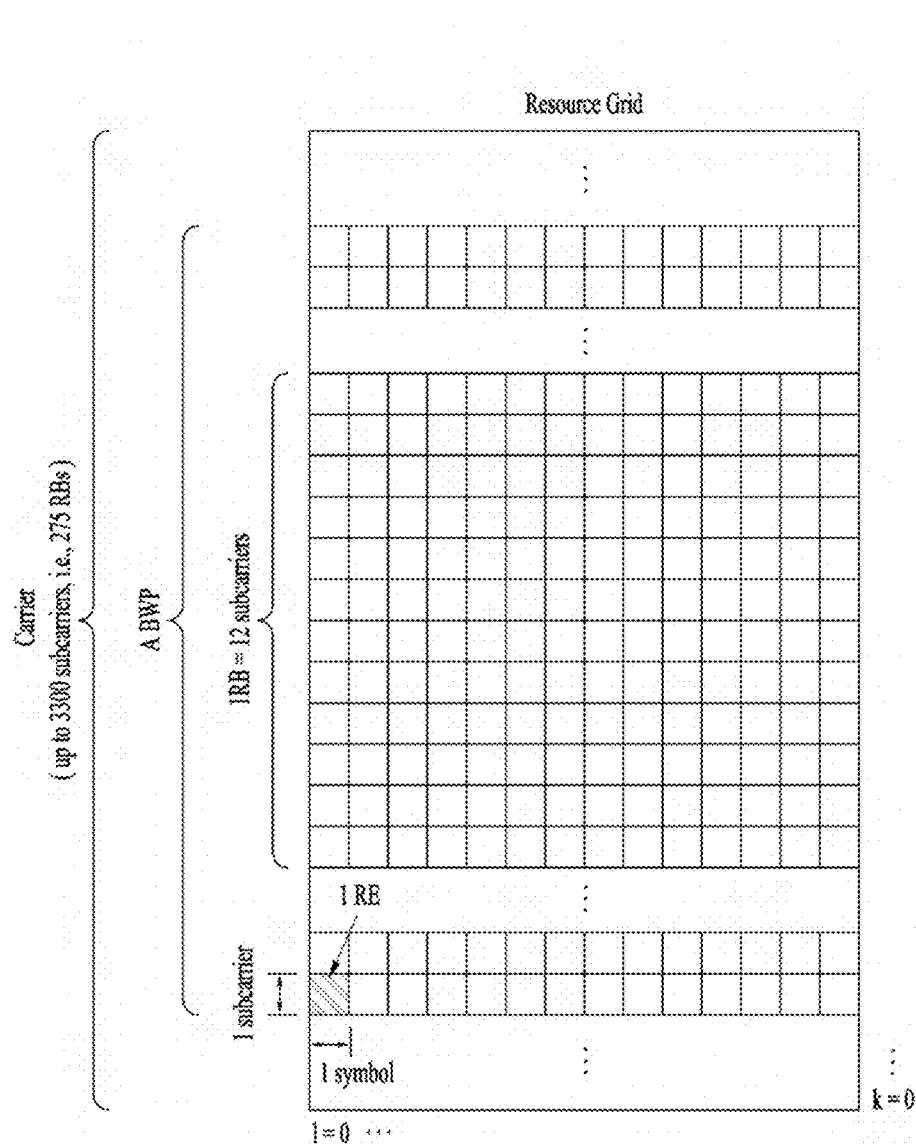
FIG. 7 is a diagram illustrating a slot structure in an NR frame according to an embodiment of the present disclosure.

FIG. 7 illustrates a slot structure in an NR frame according to an embodiment of the present disclosure.

Referring to FIG. 7, a slot includes a plurality of symbols in the time domain. For example, one slot may include 14 symbols in an NCP case and 12 symbols in an ECP case. Alternatively, one slot may include 7 symbols in an NCP case and 6 symbols in an ECP case.

A carrier includes a plurality of subcarriers in the frequency domain. An RB may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, or the like). A carrier may include up to N (e.g., 5) BWPs. Data communication may be conducted in an activated BWP. Each element may be referred to as a resource element (RE) in a resource grid, to which one complex symbol may be mapped.

A radio interface between UEs or a radio interface between a UE and a network may include L1, L2, and L3. In various embodiments of the present disclosure, L1 may refer to the PHY layer. For example, L2 may refer to at least one of the MAC layer, the RLC layer, the PDCH layer, or the SDAP layer. For example, L3 may refer to the RRC layer.

Now, a description will be given of sidelink (SL) communication.

FIG. 8 illustrates a radio protocol architecture for SL communication according to an embodiment of the present disclosure. Specifically, FIG. 8(a) illustrates a user-plane protocol stack in LTE, and FIG. 8(b) illustrates a control-plane protocol stack in LTE.

FIG. 9 illustrates a radio protocol architecture for SL communication according to an embodiment of the present disclosure. Specifically, FIG. 9(a) illustrates a user-plane protocol stack in NR, and FIG. 9(b) illustrates a control-plane protocol stack in NR.

Figure 10:
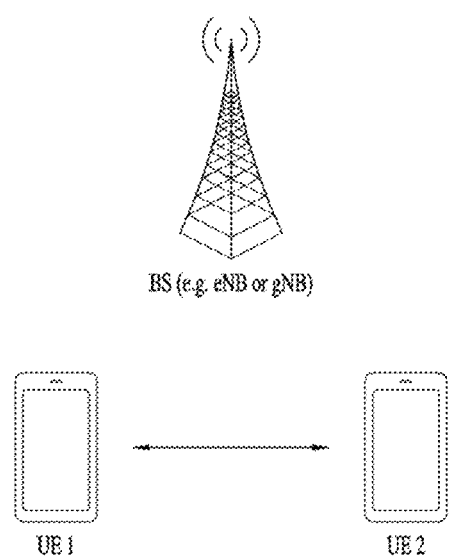
FIG. 10 is a diagram illustrating user equipments (UEs) which conduct V2X or SL communication between them according to an embodiment of the present disclosure.

FIG. 10 illustrates UEs that conduct V2X or SL communication between them according to an embodiment of the present disclosure.

Referring to FIG. 10, the term "UE" in V2X or SL communication may mainly refer to a terminal of a user. However, when network equipment such as a BS transmits and receives a signal according to a UE-to-UE communication scheme, the BS may also be regarded as a kind of UE. For example, a first UE (UE1) may be a first device 100 and a second UE (UE2) may be a second device 200.

For example, UE1 may select a resource unit corresponding to specific resources in a resource pool which is a set of resources. UE1 may then transmit an SL signal in the resource unit. For example, UE2, which is a receiving UE, may be configured with the resource pool in which UE1 may transmit a signal, and detect the signal from UE1 in the resource pool.

When UE1 is within the coverage of the BS, the BS may indicate the resource pool to UE1. On the contrary, when UE1 is outside the coverage of the BS, another UE may indicate the resource pool to UE1, or UE1 may use a predetermined resource pool.

In general, a resource pool may include a plurality of resource units, and each UE may select one or more resource units and transmit an SL signal in the selected resource units.

Figure 11:
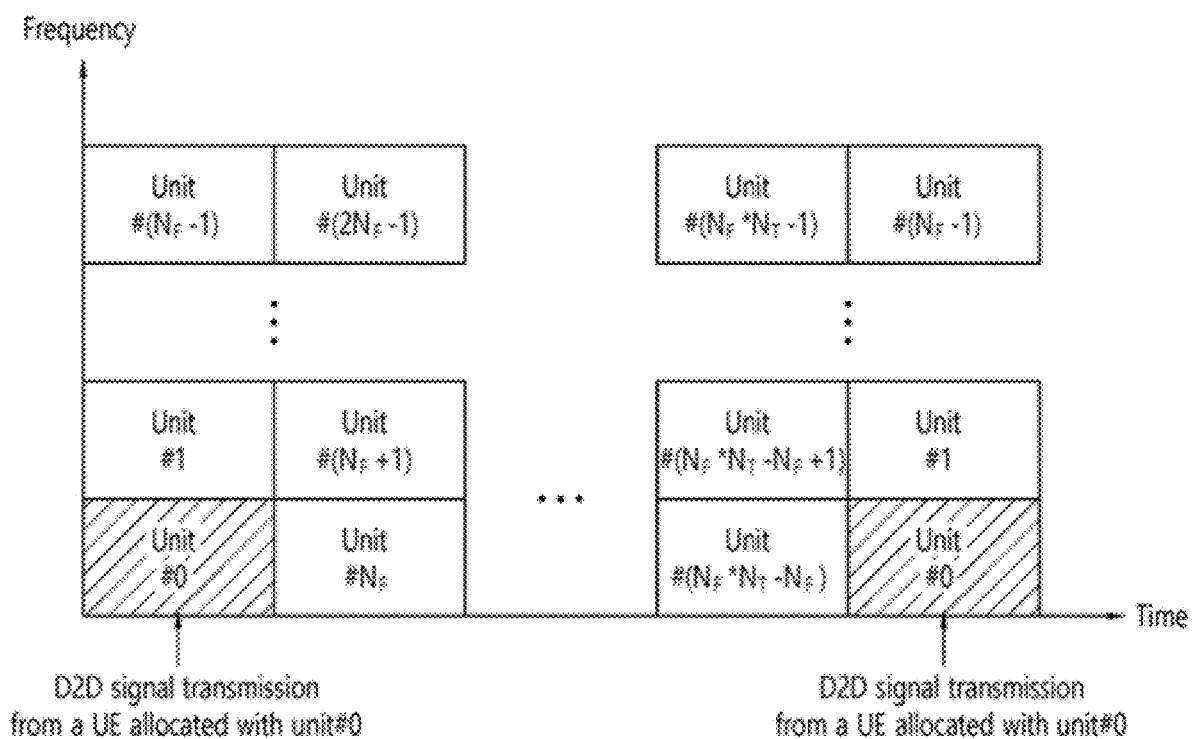
FIG. 11 is diagram illustrating resource units for V2X or SL communication according to an embodiment of the present disclosure.

FIG. 11 illustrates resource units for V2X or SL communication according to an embodiment of the present disclosure.

Figure 13:
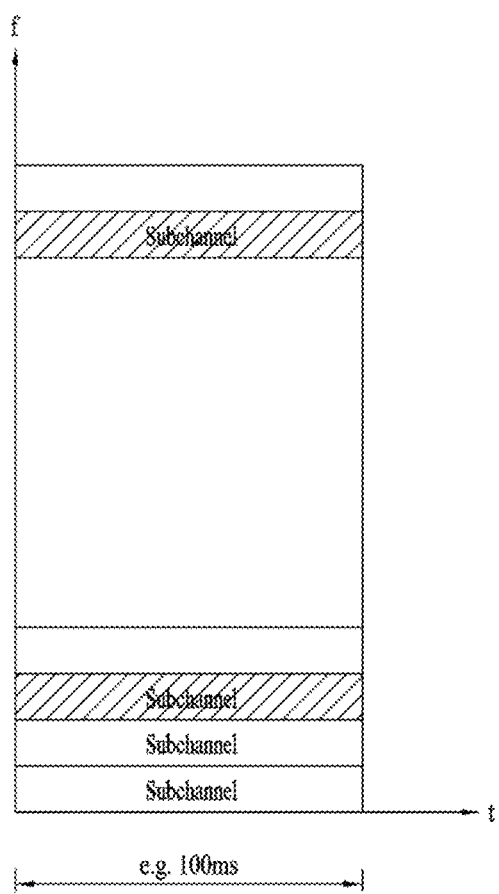
FIG. 13 is a diagram illustrating a resource unit for channel busy ratio (CBR) measurement according to an embodiment of the present disclosure.

Referring to FIG. 11, the total frequency resources of a resource pool may be divided into NF frequency resources, and the total time resources of the resource pool may be divided into NT time resources. Thus, a total of NF*NT resource units may be defined in the resource pool. FIG. 13 illustrates an example in which the resource pool is repeated with a periodicity of NT subframes.

As illustrates in FIG. 11, one resource unit (e.g., Unit #0) may appear repeatedly with a periodicity. Alternatively, to achieve a diversity effect in the time or frequency domain, the index of a physical resource unit to which one logical resource unit is mapped may change over time in a predetermined pattern. In the resource unit structure, a resource pool may refer to a set of resource units available to a UE for transmission of an SL signal.

Resource pools may be divided into several types. For example, each resource pool may be classified as follows according to the content of an SL signal transmitted in the resource pool.

(1) A scheduling assignment (SA) may be a signal including information about the position of resources used for a transmitting UE to transmit an SL data channel, a modulation and coding scheme (MCS) or multiple input multiple output (MIMO) transmission scheme required for data channel demodulation, a timing advertisement (TA), and so on. The SA may be multiplexed with the SL data in the same resource unit, for transmission. In this case, an SA resource pool may refer to a resource pool in which an SA is multiplexed with SL data, for transmission. The SA may be referred to as an SL control channel.

(2) An SL data channel (PSSCH) may be a resource pool used for a transmitting UE to transmit user data. When an SA is multiplexed with SL data in the same resource unit, for transmission, only the SL data channel except for SA information may be transmitted in a resource pool for the SL data channel. In other words, REs used to transmit the SA information in an individual resource unit in an SA resource pool may still be used to transmit SL data in the resource pool of the SL data channel. For example, the transmitting UE may transmit the PSSCH by mapping the PSSCH to consecutive PRBs.

(3) A discovery channel may be a resource pool used for a transmitting UE to transmit information such as its ID. The transmitting UE may enable a neighboring UE to discover itself on the discovery channel.

Even when SL signals have the same contents as described above, different resource pools may be used according to the transmission/reception properties of the SL signals. For example, in spite of the same SL data channel or discovery message, a different resources pool may be used for an SL signal according to a transmission timing determination scheme for the SL signal (e.g., whether the SL signal is transmitted at a reception time of a synchronization reference signal (RS) or at a time resulting from applying a predetermined TA to the reception time), a resource allocation scheme for the SL signal (e.g., whether a BS allocates transmission resources of an individual signal to an individual transmitting UE or whether the individual transmitting UE selects its own individual signal transmission resources in the resource pool), the signal format of the SL signal (e.g., the number of symbols occupied by each SL signal in one subframe, or the number of subframes used for transmission of one SL signal), the strength of a signal from the BS, the transmission power of the SL UE, and so on.

Resource allocation in SL will be described below.

Figure 12:
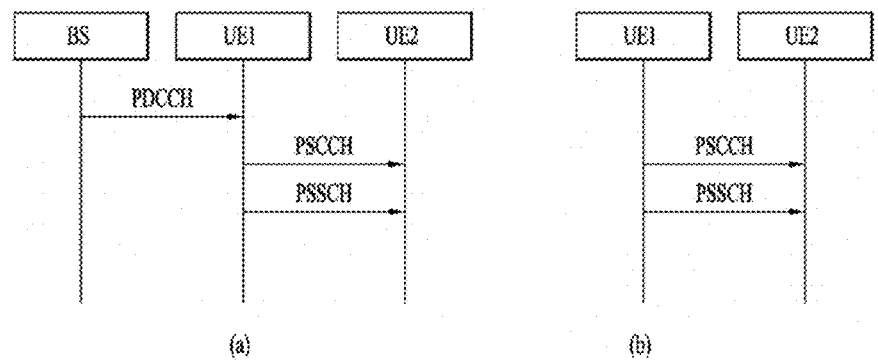
FIG. 12 is a diagram illustrating signal flows for V2X or SL communication procedures of a UE according to transmission modes according to an embodiment of the present disclosure.

FIG. 12 illustrates a procedure of performing V2X or SL communication according to a transmission mode in a UE according to an embodiment of the present disclosure. In various embodiments of the present disclosure, a transmission mode may also be referred to as a mode or a resource allocation mode. For the convenience of description, a transmission mode in LTE may be referred to as an LTE transmission mode, and a transmission mode in NR may be referred to as an NR resource allocation mode.

For example, FIG. 12(a) illustrates a UE operation related to LTE transmission mode 1 or LTE transmission mode 3. Alternatively, for example, FIG. 12(a) illustrates a UE operation related to NR resource allocation mode 1. For example, LTE transmission mode 1 may be applied to general SL communication, and LTE transmission mode 3 may be applied to V2X communication.

For example, FIG. 12(b) illustrates a UE operation related to LTE transmission mode 2 or LTE transmission mode 4. Alternatively, for example, FIG. 12(b) illustrates a UE operation related to NR resource allocation mode 2.

Referring to FIG. 12(a), in LTE transmission mode 1, LTE transmission mode 3, or NR resource allocation mode 1, a BS may schedule SL resources to be used for SL transmission of a UE. For example, the BS may perform resource scheduling for UE1 through a PDCCH (more specifically, DL control information (DCI)), and UE1 may perform V2X or SL communication with UE2 according to the resource scheduling. For example, UE1 may transmit sidelink control information (SCI) to UE2 on a PSCCH, and then transmit data based on the SCI to UE2 on a PSSCH.

For example, in NR resource allocation mode 1, a UE may be provided with or allocated resources for one or more SL transmissions of one transport block (TB) by a dynamic grant from the BS. For example, the BS may provide the UE with resources for transmission of a PSCCH and/or a PSSCH by the dynamic grant. For example, a transmitting UE may report an SL hybrid automatic repeat request (SL HARQ) feedback received from a receiving UE to the BS. In this case, PUCCH resources and a timing for reporting the SL HARQ feedback to the BS may be determined based on an indication in a PDCCH, by which the BS allocates resources for SL transmission.

For example, the DCI may indicate a slot offset between the DCI reception and a first SL transmission scheduled by the DCI. For example, a minimum gap between the DCI that schedules the SL transmission resources and the resources of the first scheduled SL transmission may not be smaller than a processing time of the UE.

For example, in NR resource allocation mode 1, the UE may be periodically provided with or allocated a resource set for a plurality of SL transmissions through a configured grant from the BS. For example, the grant to be configured may include configured grant type 1 or configured grant type 2. For example, the UE may determine a TB to be transmitted in each occasion indicated by a given configured grant.

For example, the BS may allocate SL resources to the UE in the same carrier or different carriers.

For example, an NR gNB may control LTE-based SL communication. For example, the NR gNB may transmit NR DCI to the UE to schedule LTE SL resources. In this case, for example, a new RNTI may be defined to scramble the NR DCI. For example, the UE may include an NR SL module and an LTE SL module.

For example, after the UE including the NR SL module and the LTE SL module receives NR SL DCI from the gNB, the NR SL module may convert the NR SL DCI into LTE DCI type 5A, and transmit LTE DCI type 5A to the LTE SL module every Xms. For example, after the LTE SL module receives LTE DCI format 5A from the NR SL module, the LTE SL module may activate and/or release a first LTE subframe after Z ms. For example, X may be dynamically indicated by a field of the DCI. For example, a minimum value of X may be different according to a UE capability. For example, the UE may report a single value according to its UE capability. For example, X may be positive.

Referring to FIG. 12(b), in LTE transmission mode 2, LTE transmission mode 4, or NR resource allocation mode 2, the UE may determine SL transmission resources from among SL resources preconfigured or configured by the BS/network. For example, the preconfigured or configured SL resources may be a resource pool. For example, the UE may autonomously select or schedule SL transmission resources. For example, the UE may select resources in a configured resource pool on its own and perform SL communication in the selected resources. For example, the UE may select resources within a selection window on its own by a sensing and resource (re)selection procedure. For example, the sensing may be performed on a subchannel basis. UE1, which has autonomously selected resources in a resource pool, may transmit SCI to UE2 on a PSCCH and then transmit data based on the SCI to UE2 on a PSSCH.

For example, a UE may help another UE with SL resource selection. For example, in NR resource allocation mode 2, the UE may be configured with a grant configured for SL transmission. For example, in NR resource allocation mode 2, the UE may schedule SL transmission for another UE. For example, in NR resource allocation mode 2, the UE may reserve SL resources for blind retransmission.

For example, in NR resource allocation mode 2, UE1 may indicate the priority of SL transmission to UE2 by SCI. For example, UE2 may decode the SCI and perform sensing and/or resource (re)selection based on the priority. For example, the resource (re)selection procedure may include identifying candidate resources in a resource selection window by UE2 and selecting resources for (re)transmission from among the identified candidate resources by UE2. For example, the resource selection window may be a time interval during which the UE selects resources for SL transmission. For example, after UE2 triggers resource (re)selection, the resource selection window may start at T1≥0, and may be limited by the remaining packet delay budget of UE2. For example, when specific resources are indicated by the SCI received from UE1 by the second UE and an L1 SL reference signal received power (RSRP) measurement of the specific resources exceeds an SL RSRP threshold in the step of identifying candidate resources in the resource selection window by UE2, UE2 may not determine the specific resources as candidate resources. For example, the SL RSRP threshold may be determined based on the priority of SL transmission indicated by the SCI received from UE1 by UE2 and the priority of SL transmission in the resources selected by UE2.

For example, the L1 SL RSRP may be measured based on an SL demodulation reference signal (DMRS). For example, one or more PSSCH DMRS patterns may be configured or preconfigured in the time domain for each resource pool. For example, PDSCH DMRS configuration type 1 and/or type 2 may be identical or similar to a PSSCH DMRS pattern in the frequency domain. For example, an accurate DMRS pattern may be indicated by the SCI. For example, in NR resource allocation mode 2, the transmitting UE may select a specific DMRS pattern from among DMRS patterns configured or preconfigured for the resource pool.

For example, in NR resource allocation mode 2, the transmitting UE may perform initial transmission of a TB without reservation based on the sensing and resource (re)selection procedure. For example, the transmitting UE may reserve SL resources for initial transmission of a second TB using SCI associated with a first TB based on the sensing and resource (re)selection procedure.

For example, in NR resource allocation mode 2, the UE may reserve resources for feedback-based PSSCH retransmission through signaling related to a previous transmission of the same TB. For example, the maximum number of SL resources reserved for one transmission, including a current transmission, may be 2, 3 or 4. For example, the maximum number of SL resources may be the same regardless of whether HARQ feedback is enabled. For example, the maximum number of HARQ (re)transmissions for one TB may be limited by a configuration or preconfiguration. For example, the maximum number of HARQ (re)transmissions may be up to 32. For example, if there is no configuration or preconfiguration, the maximum number of HARQ (re)transmissions may not be specified. For example, the configuration or preconfiguration may be for the transmitting UE. For example, in NR resource allocation mode 2, HARQ feedback for releasing resources which are not used by the UE may be supported.

For example, in NR resource allocation mode 2, the UE may indicate one or more subchannels and/or slots used by the UE to another UE by SCI. For example, the UE may indicate one or more subchannels and/or slots reserved for PSSCH (re)transmission by the UE to another UE by SCI. For example, a minimum allocation unit of SL resources may be a slot. For example, the size of a subchannel may be configured or preconfigured for the UE.

SCI will be described below.

While control information transmitted from a BS to a UE on a PDCCH is referred to as DCI, control information transmitted from one UE to another UE on a PSCCH may be referred to as SCI. For example, the UE may know the starting symbol of the PSCCH and/or the number of symbols in the PSCCH before decoding the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) on the PSCCH and/or PSSCH to the receiving UE. The receiving UE may decode the two consecutive SCIs (e.g., 2-stage SCI) to receive the PSSCH from the transmitting UE. For example, when SCI configuration fields are divided into two groups in consideration of a (relatively) large SCI payload size, SCI including a first SCI configuration field group is referred to as first SCI. SCI including a second SCI configuration field group may be referred to as second SCI. For example, the transmitting UE may transmit the first SCI to the receiving UE on the PSCCH. For example, the transmitting UE may transmit the second SCI to the receiving UE on the PSCCH and/or PSSCH. For example, the second SCI may be transmitted to the receiving UE on an (independent) PSCCH or on a PSSCH in which the second SCI is piggybacked to data. For example, the two consecutive SCIs may be applied to different transmissions (e.g., unicast, broadcast, or groupcast).

For example, the transmitting UE may transmit all or part of the following information to the receiving UE by SCI. For example, the transmitting UE may transmit all or part of the following information to the receiving UE by first SCI and/or second SCI.

PSSCH-related and/or PSCCH-related resource allocation information, for example, the positions/number of time/frequency resources, resource reservation information (e.g. a periodicity), and/or an SL channel state information (CSI) report request indicator or SL (L1) RSRP (and/or SL (L1) reference signal received quality (RSRQ) and/or SL (L1) received signal strength indicator (RSSI)) report request indicator, and/or an SL CSI transmission indicator (on PSSCH) (or SL (L1) RSRP (and/or SL (L1) RSRQ and/or SL (L1) RSSI) information transmission indicator), and/or MCS information, and/or transmission power information, and/or L1 destination ID information and/or L1 source ID information, and/or SL HARQ process ID information, and/or new data indicator (NDI) information, and/or redundancy version (RV) information, and/or QoS information (related to transmission traffic/packet), for example, priority information, and/or An SL CSI-RS transmission indicator or information about the number of SL CSI-RS antenna ports (to be transmitted);

Location information about a transmitting UE or location (or distance area) information about a target receiving UE (requested to transmit an SL HARQ feedback), and/or RS (e.g., DMRS or the like) information related to decoding and/or channel estimation of data transmitted on a PSSCH, for example, information related to a pattern of (time-frequency) mapping resources of the DMRS, rank information, and antenna port index information.

For example, the first SCI may include information related to channel sensing. For example, the receiving UE may decode the second SCI using the PSSCH DMRS. A polar code used for the PDCCH may be applied to the second SCI. For example, the payload size of the first SCI may be equal for unicast, groupcast and broadcast in a resource pool. After decoding the first SCI, the receiving UE does not need to perform blind decoding on the second SCI. For example, the first SCI may include scheduling information about the second SCI.

In various embodiments of the present disclosure, since the transmitting UE may transmit at least one of the SCI, the first SCI, or the second SCI to the receiving UE on the PSCCH, the PSCCH may be replaced with at least one of the SCI, the first SCI, or the second SC. Additionally or alternatively, for example, the SCI may be replaced with at least one of the PSCCH, the first SCI, or the second SCI. Additionally or alternatively, for example, since the transmitting UE may transmit the second SCI to the receiving UE on the PSSCH, the PSSCH may be replaced with the second SCI.

SL radio link monitoring (SLM) will be described below.

For unicast AS-level link management, SL RLM and/or radio link failure (RLF) declaration may be supported. In RLC acknowledged mode (SL AM) of SL unicast, the RLF declaration may be triggered by an indication from the RLC indicating that a maximum number of retransmissions has been reached. An AS-level link status (e.g., failure) may need to be known to a higher layer. Unlike the RLM procedure for unicast, a groupcast-related RLM design may not be considered. The RLM and/or RLF declaration may not be needed between group members for groupcast.

For example, the transmitting UE may transmit an RS to the receiving UE, and the receiving UE may perform SL RLM using the RS. For example, the receiving UE may declare an SL RLF using the RS. For example, the RS may be referred to as an SL RS.

SL measurement and reporting will be described below.

For the purpose of QoS prediction, initial transmission parameter setting, link adaptation, link management, admission control, and so on, SL measurement and reporting (e.g., an RSRP or an RSRQ) between UEs may be considered in SL. For example, the receiving UE may receive an RS from the transmitting UE and measure the channel state of the transmitting UE based on the RS. Further, the receiving UE may report CSI to the transmitting UE. SL-related measurement and reporting may include measurement and reporting of a CBR and reporting of location information. Examples of CSI for V2X include a channel quality indicator (CQI), a precoding matrix index (PMI), a rank indicator (RI), an RSRP, an RSRQ, a path gain/pathloss, an SRS resource indicator (SRI), a CSI-RS resource indicator (CRI), an interference condition, a vehicle motion, and the like. For unicast communication, a CQI, an RI and a PMI or a part of them may be supported in a non-subband-based aperiodic CSI report based on the assumption of four or fewer antenna ports. The CSI procedure may not depend on a standalone RS. CSI reporting may be activated and deactivated depending on a configuration.

For example, the transmitting UE may transmit a channel state information-reference signal (CSI-RS) to the receiving UE, and the receiving UE may measure a CQI or RI using the CSI-RS. For example, the CSI-RS may be referred to as an SL CSI-RS. For example, the CSI-RS may be confined to PSSCH transmission. For example, the transmitting UE may transmit the CSI-RS in PSSCH resources to the receiving UE.

Now, an HARQ procedure will be described.

An error compensation technique for ensuring communication reliability may include a forward error correction (FEC) scheme and an automatic repeat request (ARQ) scheme. In the FEC scheme, an error in a receiver may be corrected by adding an extra error correction code to information bits. Although the FEC scheme offers the benefits of a short time delay and no need for separately exchanging information between a transmitter and a receiver, the FEC scheme has decreased system efficiency in a good channel environment. The ARQ scheme may improve the transmission reliability. Despite the advantage, the ARQ scheme incurs a time delay and has decreased system efficiency in a poor channel environment.

HARQ is a combination of FEC and ARQ. In HARQ, it is determined whether data received in the PHY layer includes an error that is not decodable, and upon generation of an error, a retransmission is requested to thereby improve performance.

In SL unicast and groupcast, HARQ feedback and HARQ combining in the PHY layer may be supported. For example, when the receiving UE operates in resource allocation mode 1 or 2, the receiving UE may receive a PSSCH from the transmitting UE, and transmit an HARQ feedback for the PSSCH in a sidelink feedback control information (SFCI) format on a physical sidelink feedback channel (PSFCH).

For example, SL HARQ feedback may be enabled for unicast. In this case, in a non-code block group (non-CBG) operation, when the receiving UE decodes a PSCCH directed to it and succeeds in decoding an RB related to the PSCCH, the receiving UE may generate an HARQ-ACK and transmit the HARQ-ACK to the transmitting UE. On the other hand, after the receiving UE decodes the PSCCH directed to it and fails in decoding the TB related to the PSCCH, the receiving UE may generate an HARQ-NACK and transmit the HARQ-NACK to the transmitting UE.

For example, SL HARQ feedback may be enabled for groupcast. For example, in a non-CBG operation, two HARQ feedback options may be supported for groupcast.

(1) Groupcast option 1: When the receiving UE decodes a PSCCH directed to it and then fails to decode a TB related to the PSCCH, the receiving UE transmits an HARQ-NACK on a PSFCH to the transmitting UE. On the contrary, when the receiving UE decodes the PSCCH directed to it and then succeeds in decoding the TB related to the PSCCH, the receiving UE may not transmit an HARQ-ACK to the transmitting UE.

(2) Groupcast option 2: When the receiving UE decodes a PSCCH directed to it and then fails to decode a TB related to the PSCCH, the receiving UE transmits an HARQ-NACK on a PSFCH to the transmitting UE. On the contrary, when the receiving UE decodes the PSCCH directed to it and then succeeds in decoding the TB related to the PSCCH, the receiving UE may transmit an HARQ-ACK to the transmitting UE on the PSFCH.

For example, when groupcast option 1 is used for SL HARQ feedback, all UEs performing groupcast communication may share PSFCH resources. For example, UEs belonging to the same group may transmit HARQ feedbacks in the same PSFCH resources.

For example, when groupcast option 2 is used for SL HARQ feedback, each UE performing groupcast communication may use different PSFCH resources for HARQ feedback transmission. For example, UEs belonging to the same group may transmit HARQ feedbacks in different PSFCH resources.

For example, when SL HARQ feedback is enabled for groupcast, the receiving UE may determine whether to transmit an HARQ feedback to the transmitting UE based on a transmission-reception (TX-RX) distance and/or an RSRP.

For example, in the case of TX-RX distance-based HARQ feedback in groupcast option 1, when the TX-RX distance is less than or equal to a communication range requirement, the receiving UE may transmit an HARQ feedback for the PSSCH to the transmitting UE. On the other hand, when the TX-RX distance is larger than the communication range requirement, the receiving UE may not transmit the HARQ feedback for the PSSCH to the transmitting UE. For example, the transmitting UE may inform the receiving UE of the location of the transmitting UE by SCI related to the PSSCH. For example, the SCI related to the PSSCH may be second SCI. For example, the receiving UE may estimate or obtain the TX-RX distance based on the locations of the receiving UE and the transmitting UE. For example, the receiving UE may decode the SCI related to the PSSCH, so as to know the communication range requirement used for the PSSCH.

For example, in resource allocation mode 1, a time between the PSFCH and the PSSCH may be configured or preconfigured. In unicast and groupcast, when a retransmission is needed on SL, this may be indicated to the BS by an in-coverage UE using a PUCCH. The transmitting UE may transmit an indication to its serving BS in the form of a scheduling request (SR)/buffer status report (BSR) instead of an HARQ ACK/NACK. Further, even though the BS fails to receive the indication, the BS may schedule SL retransmission resources for the UE. For example, in resource allocation mode 2, the time between the PSFCH and the PSSCH may be configured or preconfigured.

For example, from the viewpoint of transmission of a UE on a carrier, time division multiplexing (TDM) between a PSCCH/PSSCH and a PSFCH may be allowed for a PSFCH format for the SL in a slot. For example, a sequence-based PSFCH format with one symbol may be supported. The one symbol may not be an AGC period. For example, the sequence-based PSFCH format may be applied to unicast and groupcast.

For example, PSFCH resources may be preconfigured or periodically configured to span N slot periods in slots related to a resource pool. For example, N may be set to one or more values equal to or larger than 1. For example, N may be 1, 2 or 4. For example, an HARQ feedback for a transmission in a specific resource pool may be transmitted only on a PSFCH in the specific resource pool.

For example, when the transmitting UE transmits the PSSCH in slot #X to slot #N to the receiving UE, the receiving UE may transmit an HARQ feedback for the PSSCH in slot #(N+A) to the transmitting UE. For example, slot #(N+A) may include PSFCH resources. For example, A may be a smallest integer greater than or equal to K. For example, K may be the number of logical slots. In this case, K may be the number of slots in the resource pool. Alternatively, for example, K may be the number of physical slots. In this case, K may be the number of slots inside and outside the resource pool.

For example, when the receiving UE transmits an HARQ feedback in PSFCH resources in response to one PSSCH transmitted by the transmitting UE, the receiving UE may determine the frequency area and/or code area of the PSFCH resources based on an implicit mechanism in the configured resource pool. For example, the receiving UE may determine the frequency area and/or code area of the PSFCH resources based on at least one of a slot index related to the PSCCH/PSSCH/PSFCH, a subchannel related to the PSCCH/PSSCH, or an ID identifying each receiving UE in a group for HARQ feedback based on groupcast option 2. Additionally or alternatively, for example, the receiving UE may determine the frequency area and/or code area of the PSFCH resources based on at least one of an SL RSRP, a signal-to-interference and noise ratio (SINR), an L1 source ID, or location information.

For example, when an HARQ feedback transmission of the UE on the PSFCH overlaps with an HARQ feedback reception of the UE on the PSFCH, the UE may select either the HARQ feedback transmission on the PSFCH or the HARQ feedback reception on the PSFCH based on a priority rule. For example, the priority rule may be based on a minimum priority indication of the related PSCCH/PSSCH.

For example, when HARQ feedback transmissions of the UE for a plurality of UEs overlap with each other on the PSFCH, the UE may select a specific HARQ feedback transmission based on the priority rule. For example, the priority rule may be based on the minimum priority indication of the related PSCCH/PSSCH.

Now, a description will be given of power control.

Methods of controlling its UL transmission power at a UE may include open-loop power control (OLPC) and closed-loop power control (CLPC). According to OLPC, the UE may estimate a DL pathloss from the BS of the cell to which the UE belongs, and perform power control by compensating for the pathloss. For example, according to OLPC, when the distance between the UE and the BS is further increased and a DL pathloss is increased, the UE may control UL power by further increasing UL transmission power. According to CLPC, the UE may receive information (e.g., a control signal) required for adjusting UL transmission power from the BS, and control UL power based on the information received from the BS. That is, according to CLPC, the UE may control the UL power according to a direct power control command received from the BS.

OLPC may be supported in SL. Specifically, when a transmitting UE is within the coverage of a BS, the BS may enable OLPC for unicast, groupcast, and broadcast transmissions based on a pathloss between the transmitting UE and a serving BS of the transmitting UE. When the transmitting UE receives information/a configuration from the BS to enable OLPC, the transmitting UE may enable OLPC for unicast, groupcast or broadcast transmissions. This may be intended to mitigate interference with UL reception of the BS.

Additionally, in the case of at least unicast, a configuration may be enabled to use a pathloss between the transmitting UE and the receiving UE. For example, the configuration may be preconfigured for the UEs. The receiving UE may report an SL channel measurement result (e.g., SL RSRP) to the transmitting UE, and the transmitting UE may derive a pathloss estimate from the SL channel measurement result reported by the receiving UE. For example, in the SL, when the transmitting UE transmits an RS to the receiving UE, the receiving UE may measure a channel between the transmitting UE and the receiving UE based on the RS transmitted by the transmitting UE. The receiving UE may transmit the SL channel measurement result to the transmitting UE. The transmitting UE may then estimate an SL pathloss from the receiving UE based on the SL channel measurement result. The transmitting UE may perform SL power control by compensating for the estimated pathloss, and perform SL transmission to the receiving UE. According to OLPC in SL, for example, when the distance between the transmitting UE and the receiving UE becomes greater and the SL pathloss becomes larger, the transmitting UE may control the SL transmission power by further increasing the transmission power of the SL. The power control may be applied for transmission of an SL physical channel (e.g., PSCCH, PSSCH, or PSFCH) and/or an SL signal.

To support OLPC, in the case of at least unicast, long-term measurements (i.e., L3 filtering) may be supported in the SL.

For example, a total SL transmission power may be equal in symbols used for PSCCH and/or PSSCH transmission in a slot. For example, a maximum SL transmission power may be preconfigured or configured for the transmitting UE or.

For example, in the case of SL OLPC, the transmitting UE may be configured to use only a DL pathloss (e.g., a pathloss between the transmitting UE and the BS). For example, in the case of SL OLPC, the transmitting UE may be configured to use only an SL pathloss (e.g., a pathloss between the transmitting UE and the receiving UE). For example, in the case of SL OLPC, the transmitting UE may be configured to use a DL pathloss and an SL pathloss.

For example, when it is configured that both a DL pathloss and an SL pathloss are used for SL OLPC, the transmitting UE may determine, as transmission power, the minimum between power obtained based on the DL pathloss and power obtained based on the SL pathloss. The minimum value may be determined as the transmission power. For example, P0 and alpha values may be configured separately for the DL pathloss and the SL pathloss, or preconfigured. For example, P0 may be a user-specific parameter related to an average received SINR. For example, the alpha value may be a weight value for a pathloss.

SL congestion control will be described below.

When the UE autonomously determines SL transmission resources, the UE also autonomously determines the size and frequency of the resources used by itself. Obviously, due to constraints from the network, the use of resource sizes or frequencies above a certain level may be limited. However, in a situation in which a large number of UEs are concentrated in a specific region at a specific time point, when all the UEs use relatively large resources, overall performance may be greatly degraded due to interference.

Therefore, the UE needs to observe a channel condition. When the UE determines that excessive resources are being consumed, it is desirable for the UE to take an action of reducing its own resource use. In this specification, this may be referred to as congestion control. For example, the UE may determine whether an energy measured in a unit time/frequency resource is equal to or greater than a predetermined level and control the amount and frequency of its transmission resources according to the ratio of unit time/frequency resources in which the energy equal to or greater than the predetermined level is observed. In the present disclosure, a ratio of time/frequency resources in which an energy equal to or greater than a predetermined level is observed may be defined as a CBR. The UE may measure a CBR for a channel/frequency. In addition, the UE may transmit the measured CBR to the network/BS.

FIG. 13 illustrates resource units for CBR measurement according to an embodiment of the present disclosure.

Referring to FIG. 13, a CBR may refer to the number of subchannels of which the RSSI measurements are equal to or larger than a predetermined threshold as a result of measuring an RSSI in each subchannel during a specific period (e.g., 100 ms) by a UE. Alternatively, a CBR may refer to a ratio of subchannels having values equal to or greater than a predetermined threshold among subchannels during a specific period. For example, in the embodiment of FIG. 13, on the assumption that the hatched subchannels have values greater than or equal to a predetermined threshold, the CBR may refer to a ratio of hatched subchannels for a time period of 100 ms. In addition, the UE may report the CBR to the BS.

Figure 14:
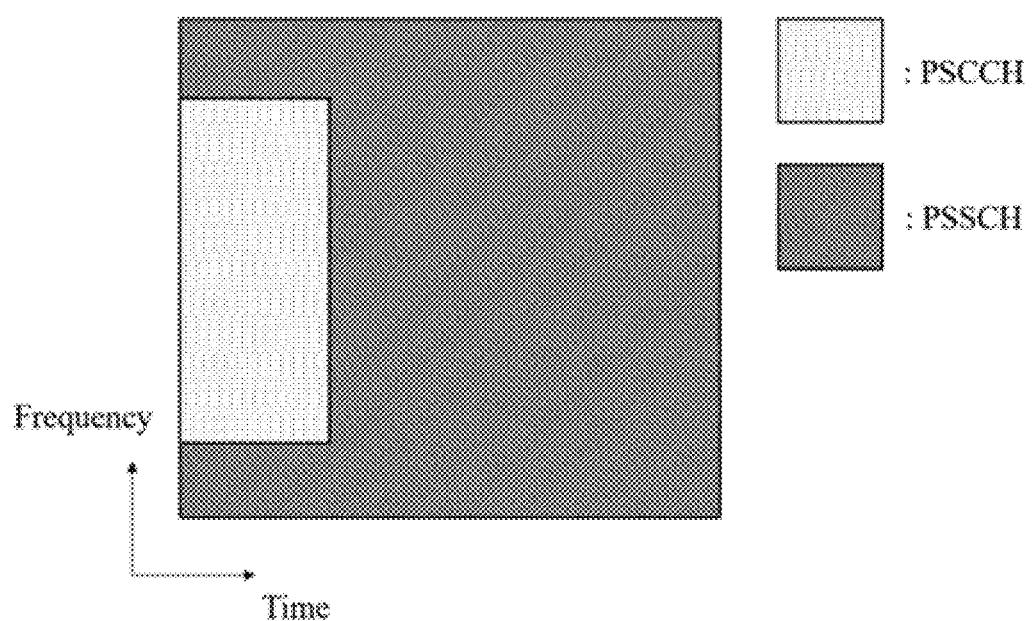
FIG. 14 is a diagram illustrating exemplary multiplexing between a physical sidelink control channel (PSCCH) and a physical sidelink shared channel (PSSCH)

For example, when a PSCCH and a PSSCH are multiplexed as illustrated in the embodiment of FIG. 14, the UE may perform one CBR measurement in one resource pool. When PSFCH resources are configured or preconfigured, the PSFCH resources may be excluded from the CBR measurement.

Further, there may be a need for performing congestion control in consideration of the priority of traffic (e.g., a packet). To this end, for example, the UE may measure a channel occupancy ratio (CR). Specifically, the UE may measure a CBR and determine a maximum value CRlimitk of a CR k (CRk) available for traffic corresponding to each priority (e.g., k) according to the CBR. For example, the UE may derive the maximum value CRlimitk of the channel occupancy ratio for the priority of traffic, based on a predetermined table of CBR measurements. For example, for relatively high-priority traffic, the UE may derive a relatively large maximum value of a channel occupancy ratio. Thereafter, the UE may perform congestion control by limiting the sum of the channel occupancy ratios of traffic with priorities k lower than i to a predetermined value or less. According to this method, a stricter channel occupancy ratio limit may be imposed on relatively low-priority traffic.

Besides, the UE may perform SL congestion control by using a scheme such as transmission power adjustment, packet dropping, determination as to whether to retransmit, and adjustment of a transmission RB size (MCS adjustment).

Embodiment

A radio link failure (RLF) operation of a UE during communication (NR-Uu) between the UE and a BS will be described below.

Figure 15:
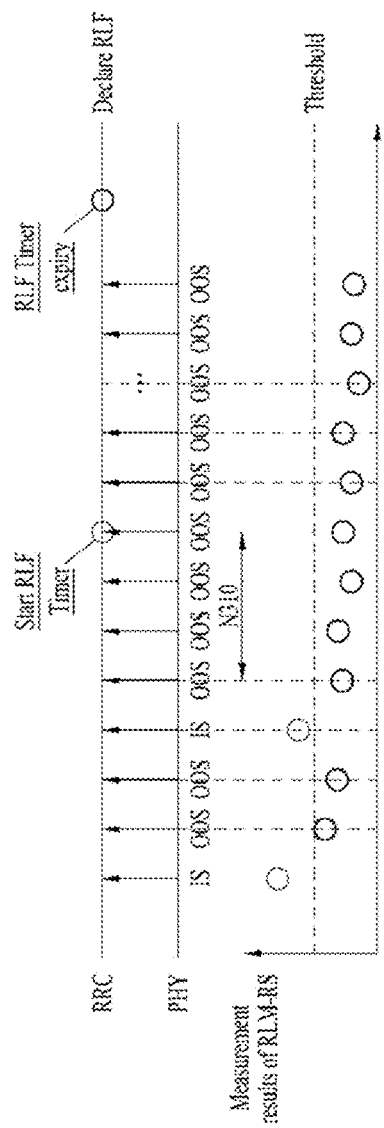
FIGS. 15 to 19 are diagrams for explaining embodiment(s)

Referring to FIG. 15, the UE may detect or declare RLF by monitoring a radio link state with the BS. For example, the UE determines whether an out of sync (OOS) event or an in sync (IS) event has occurred by determining whether the measurement of a reference signal received from the BS exceeds a threshold. In addition, an indication indicating that the OOS event or the IS event has occurred may be transmitted from the physical layer to the RRC layer.

Upon occurrence of N310 consecutive OOS events, the UE may detect RLF and activate an RLF timer. The RLF timer may be, for example, a T310 timer. When consecutive IS events occur until the RLF timer expires, the UE may stop the RLF timer and not declare RLF. However, when consecutive IS events do not occur until the RLF timer expires, the UE may declare RLF and perform an RRC re-establishment procedure.

The above-described RLF detection or declaration operation may also be performed for an SL connection between SL UEs. When consecutive OOS events occur in the SL connection and an SL UE detects RLF, the SL UE may activate an SL RLF timer (e.g., an SL T310 timer). When consecutive IS events occur until the SL RLF timer expires, the SL UE may stop the SL RLF timer and not declare RLF. However, when consecutive OOS events occur or consecutive IS events do not occur until the SL RLF timer expires, the SL UE may declare RLF.

An OOS indication for an SL connection may be transmitted from the physical layer to a higher layer in the following situations.
  When the block error rate (BLER) of a control channel decreases to or below a threshold.
  When a transmitting UE receives an HARQ NACK from a receiving UE.
  When the transmitting UE fails to receive a feedback for transmitted data from the receiving UE.

In the present disclosure, a method of preventing RLF declaration when an SL UE detects RLF and starts an SL RLF timer is proposed. Although the following proposals may be applied individually, they may be applied in combination, when possible.

Proposal 1-1

Upon detection of RLF, a receiving UE may transmit an SL measurement report to a transmitting UE.

When the receiving UE detects occurrence of consecutive OOS events by monitoring a radio link state with the transmitting UE, the receiving UE may detect RLF. The receiving UE may then activate an SL RLF timer. In this case, the receiving UE may transmit an SL measurement report to the transmitting UE. The transmitting UE may receive the SL measurement report and recognize an SL channel state with the receiving UE.

The SL measurement report transmitted from the receiving UE to the transmitting UE may include at least one of the following pieces of information.
  SL reference signal received power (RSRP) measurement value, SL channel state information (CSI) measurement value, SL reference signal received quality (RSRQ) measurement value, SL received signal strength indicator (RSSI) measurement value, or channel busy ratio (CBR) measurement value for an SL resource pool
  Cause value: The reason why the receiving UE transmits the SL measurement report
  For example, detection of consecutive OOS events.
  Transmitting UE operation: An operation that the transmitting UE may perform after receiving the SL measurement report For example, a transmission power control parameter is reconfigured.

For example, the SL measurement report received from the receiving UE is collected and transmitted to the BS.

For example, the SL measurement report that the receiving UE reports to the transmitting UE after detecting consecutive OOS events and starting the RLF timer may be interpreted as an implicit pre-RLF indication. That is, when the transmitting UE receives the SL measurement report (the SL measurement report triggered by the receiving UE which has detected consecutive OOS events) from the receiving UE, the transmitting UE may collect the SL measurement report transmitted by the receiving UE and transmit the SL measurement report to the BS, as in Proposal 1-2. In addition, the transmitting UE may wait for reception of a control parameter (a transmission power control parameter, an MCS level, or the like to be used for the transmitting UE) for SL communication from the BS.

Proposal 1-2

When the transmitting UE receives an SL measurement report from the receiving UE, the transmitting UE may collect the SL measurement report transmitted by the receiving UE and transmit the SL measurement report to the BS.

The transmitting UE may receive an SL measurement report (i.e., an SL RSRP value, an SL RSRQ value, an SL RSSI value, an SL CSI value, or an SL CBR value) from the receiving UE. The transmitting UE may check the contents (an SL measurement value, a cause value, and a transmitting UE operation) of the report and determine an operation based on the contents.

For example, when identifying that the SL measurement value and the cause value indicate "detection of consecutive OOC events" in the SL measurement report received from the receiving UE, the transmitting UE may identify that the SL channel state is poor. Accordingly, the transmitting UE may collect the SL measurement report reported by the receiving UE and transmit the collected SL measurement report to the BS.

For example, the transmitting UE may identify the measurement value in the SL measurement report received from the receiving UE and determine whether to transmit the SL measurement report (the SL measurement report received from the receiving UE) to the BS. Alternatively, the transmitting UE may identify the measurement value and the cause value in the SL measurement report received from the receiving UE and determine whether to transmit the SL measurement report to the BS. Alternatively, the receiving UE may trigger transmission of the SL measurement report from the transmitting UE to the BS by the "transmitting UE operation" parameter in the SL measurement report that the receiving UE transmits to the transmitting UE. That is, the transmitting UE may determine whether to transmit the SL measurement report to the BS by checking the transmitting UE operation parameter included in the SL measurement report received from the receiving UE.

In another embodiment, the transmitting UE may transmit, to the BS, an SL measurement value (i.e., an SL RSRP value, an SL RSRQ value, an SL RSSI value, an SL CSI value, or an SL CBR value) measured with respect to the receiving UE by the transmitting UE.

Proposal 1-3

Upon receipt of an SL measurement report from the transmitting UE, the BS may configure and indicate a transmission power control parameter and an MCS level to be used for the transmitting UE to the transmitting UE.

Upon receipt of the SL measurement report from the transmitting UE, the BS may identify an SL measurement value (i.e., an SL RSRP value, an SL RSRQ value, an SL RSSI value, an SL CSI value, or an SL CBR value) in the SL measurement report, configure a transmission power control parameter and an MCS level value to be used for the transmitting UE, and indicate the configured transmission power control parameter and MCS level to the transmitting UE.

Transmission power control parameter configured by the BS

For example, P_0, which is a nominal received power value at a receiving end after pathloss is compensated for. P_0 is a value between 0 and 1 as a factor for compensating for pathloss, which is multiplied by a pathloss value, or a maximum transmission power available for the UE.

MCS level to be used for the transmitting UE

The transmitting UE may transmit an SL message (an SL control message and/or SL data) to the receiving UE by applying the transmission power control parameter and the MCS level received from the BS.

When the receiving UE detects consecutive IS events upon receipt of the SL message that the transmitting UE has transmitted by applying the new transmission power parameter and MCS level specified by the BS before the RLF timer expires, the receiving UE may stop the RLF timer. Alternatively, when the receiving UE does not detect consecutive OOS events upon receipt of the SL message that the transmitting UE has transmitted by applying the new TX power parameter and MCS level specified by the BS before the RLF timer expires, the receiving UE may stop the RLF timer without declaring RLF. The receiving UE may then conduct normal SL communication with the transmitting UE. On the other hand, even though the transmitting UE transmits the SL message to which the new transmission power control parameter and MCS level specified by the BS are applied to the receiving UE, when the receiving UE detects consecutive OOS events, the UE may declare SL RLF. The above-described Proposal 1-1 to Proposal 1-3 may be applied independently or in combination.

Figure 16:
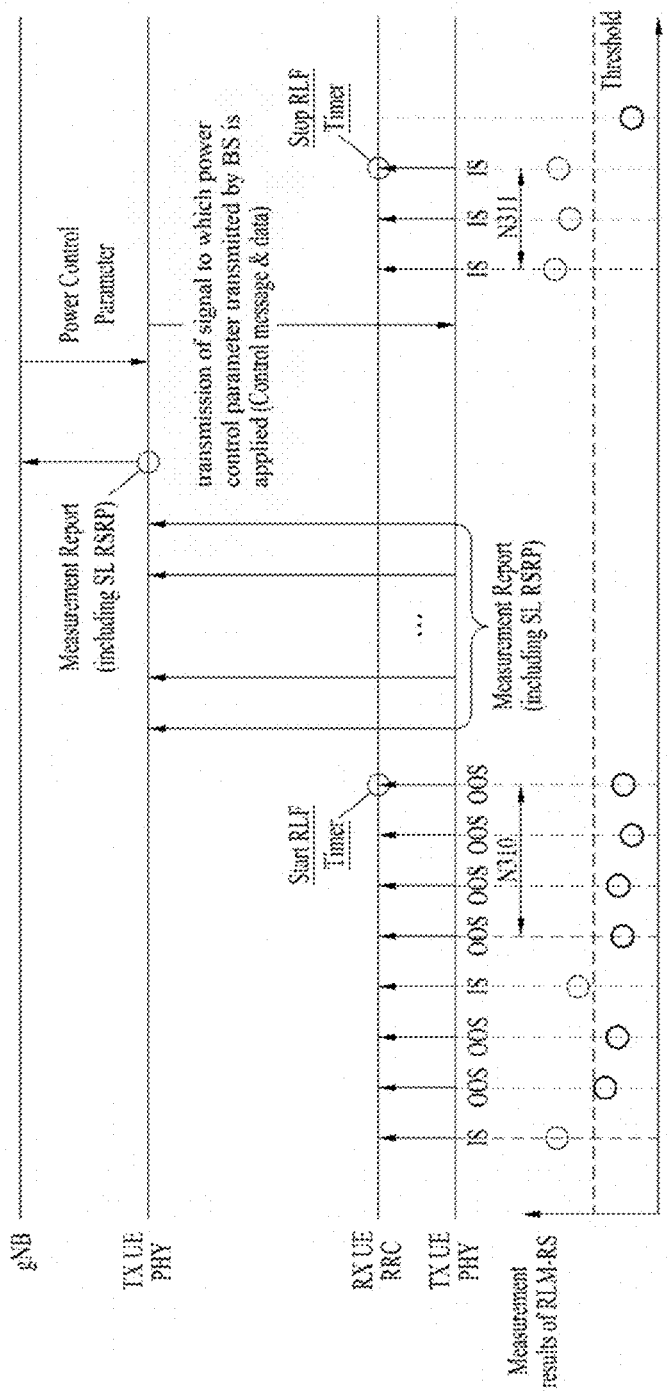

FIG. 16 is a diagram illustrating an embodiment of the afore-described Proposal 1-1 to Proposal 1-3.

Referring to FIG. 16, upon detection of consecutive OOS events, a receiving UE may start an RLF timer and transmit an SL measurement report to a transmitting UE. The transmitting UE may report the SL measurement report received from the receiving UE to a BS, receive a new transmission power control parameter, a new MCS level, and so on from the BS, and apply the new transmission power control parameter, MCS level, and so on to an SL message (a control PDU or a data PDU) to be transmitted to the receiving UE. When the receiving UE receives the SL message from the transmitting UE and detects consecutive IS events through the SL message, the receiving UE may stop the RLF timer. Normal SL communication may then be conducted between the transmitting UE and the receiving UE.

In another embodiment, RLF detection, RLF declaration, and a measurement for an SL measurement report as described in Proposal 1-1 to Proposal 1-3 may be performed by the transmitting UE. For example, the transmitting UE may detect RLF and start an RLF timer by monitoring a channel state with the receiving UE. In this case, the transmitting UE may measure an SL measurement value (i.e., an SL RSRP value, an SL RSRQ value, an SL RSSI value, an SL CSI value, or an SL CBR value) with respect to the receiving UE. The transmitting UE may transmit the SL measurement value to the BS. The BS may receive the SL measurement value from the transmitting UE and reconfigure a transmission parameter (a transmission power control parameter, an MCS level, or the like) for the transmitting UE.

In another embodiment, the transmitting UE may perform RLF detection and RLF declaration and receive an SL measurement value measured by the receiving UE from the receiving UE. Upon detection of RLF, the transmitting UE may transmit the SL measurement value received from the receiving UE to the BS.

In another embodiment, the receiving UE may perform RLF detection and RLF declaration, and the transmitting UE may measure an SL measurement value. The transmitting UE may receive an RLF detection report from the receiving UE, and may transmit its SL measurement report to the BS.

According to embodiment(s) of the present disclosure, upon detection of consecutive OOS events, the receiving UE may transmit an SL measurement report to the transmitting UE to indicate an SL channel state, and the transmitting UE may report the SL measurement report received from the receiving UE to the BS. The BS may then configure a new control parameter for SL transmission for the transmitting UE, and enable the transmitting UE to perform SL transmission by applying the new parameter. Therefore, SL RLF occurrence may be prevented.

When a transmitting UE operating in resource allocation mode 2 (in which the transmitting UE autonomously senses and selects resources) detects consecutive OOS events and thus starts an RLF timer, a method of preventing SL RLF declaration through an operation procedure between the transmitting UE and a receiving UE is proposed below. The following embodiment(s) may be applied in conjunction with the above-described Proposal 1-1 to Proposal 1-3. Further, when possible, Proposal 2-1 and Proposal 2-2 to be described later may be applied in combination.

Proposal 2-1

When the transmitting UE operating in resource allocation mode 2 (in which the transmitting UE autonomously senses and selects resources) detects consecutive OOS events and thus starts the RLF timer, the transmitting UE may indicate to the BS that the RLF timer has started. When the transmitting UE detects consecutive OOS events and thus starts the RLF timer, the transmitting UE may transmit, to the BS, an indication indicating that the RLF timer has started by a dedicated RRC message or a MAC control element.

The present disclosure also proposes that when the transmitting UE reports the start of the RLF timer to the BS, the transmitting UE also transmits an SL measurement report to the BS. Further, the transmitting UE may also transmit information (a destination ID of the transmitting UE or a PC5-RRC link ID) about a PC5-RRC link for which the RLF timer has been started due to the occurrence of consecutive OOS events, in the SL measurement report.

The SL measurement report that the transmitting UE transmits to the BS may include the following values.

SL RSRP measurement value, SL CSI measurement value, SL RSRQ measurement value, SL RSSI measurement value, or CBR measurement value for an SL resource pool Destination ID of the transmitting UE or PC5-RRC connection ID The SL measurement report transmitted by the transmitting UE to the BS may be a value measured directly by the transmitting UE, or may be an SL measurement value obtained by collecting an SL measurement report that the receiving UE has reported to the transmitting UE.

Proposal 2-2.

Upon receipt of an "RLF timer start report" message from the transmitting UE, the BS may reconfigure a "resource pool" and a transmission parameter for the transmitting UE and indicate the new "resource pool" and the new transmission parameter to the transmitting UE. The "RLF timer start report" message may include an SL measurement value.

When the BS receives the "RLF timer start report" message from the transmitting UE, the BS may determine that the PC5 connection state of the transmitting UE is not good, and reconfigure an existing "resource pool" and transmission parameter allocated to the transmitting UE and indicate the reconfigured resource pool and transmission parameter to the transmitting UE.

The new transmission parameter to be used for the transmission UE may be a transmission power control parameter or an MCS level.

The BS may reconfigure the following transmission parameters.

Transmission power control parameter for the transmitting UE, specified by the BS For example, P_0, which is a nominal received power value at a receiving end after pathloss is compensated for. P_0 is a value between 0 and 1 as a factor for compensating for pathloss, which is multiplied by a pathloss value, or a maximum transmission power available for the UE.

MCS level to be used for the transmitting UE

The transmitting UE may perform resource sensing and selection in resource allocation mode 2 based on the new "resource pool" indicated by the BS. When transmitting data in selected resources to the receiving UE, the transmitting UE may apply the new transmission power control parameter and MCS level specified by the BS.

In the case where the transmitting UE selects resources from the new resource pool specified by the BS and transmits an SL message to which the new transmission power control parameter and MCS level specified by the BS are applied to the receiving UE, when the receiving UE successfully receives the SL message from the transmitting UE, the receiving UE may transmit a feedback (i.e., HARQ ACK/NACK) to the transmitting UE. Because resources (a physical sidelink feedback channel (PSFCH)) in which the receiving UE transmits the HARQ feedback to the transmitting UE is a feedback channel related to resources of an SL data transmission channel (a physical sidelink shared channel (PSSCH)) of the "new resource pool for the transmitting UE" that the BS has newly reconfigured and indicated to the transmitting UE, the resources may be considered to be a more reliable channel than previous feedback channel resources.

For example, as the transmitting UE and the receiving UE conduct SL communication with each other by using resources of the resource pool newly reconfigured for the transmitting UE by the BS which has recognized the occurrence of consecutive OOS events in an SL channel, reported by the transmitting UE, the SL communication may be more reliable than the previous SL communication. Alternatively, as the transmitting UE and the receiving UE conduct SL communication with each other by using resources of a resource pool that the BS has newly reconfigured for the transmitting UE, referring to an SL measurement report received from the transmitting UE while simultaneously recognizing the occurrence of consecutive OOS events in an SL channel, reported by the transmitting UE, the SL communication may be more reliable than the previous SL communication.

Therefore, the probability of successfully transmitting an HARQ feedback from the receiving UE to the transmitting UE may be higher than when the receiving UE transmits an HARQ feedback in HARQ feedback resources (a PSFCH) prior to the reconfiguration. That is, the transmitting UE may successfully receive an HARQ feedback from the receiving UE, with a higher probability.

Because SL communication is conducted between the transmitting UE and the receiving UE in resources of the resource pool newly configured for the transmitting UE by the BS which has recognized the occurrence of consecutive OOS events in the SL channel, reported by the transmitting UE, the SL communication may be more reliable than the previous SL communication. Accordingly, an IS event may occur between the transmitting UE and the receiving UE, with a higher probability. When the transmitting UE detects consecutive IS events before expiration of the RLF timer, the transmitting UE may stop the RLF timer and perform a normal operation. Accordingly, RLF declaration for the SL communication may be prevented.

On the contrary, even though the transmitting UE selects resources from the new resource pool specified by the BS and transmits an SL message to which the new transmission power control parameter and MCS level specified by the BS are applied to the receiving UE, upon detection of consecutive OOS events within an RLF timer duration, the transmitting UE may declare RLF.

Figure 17:
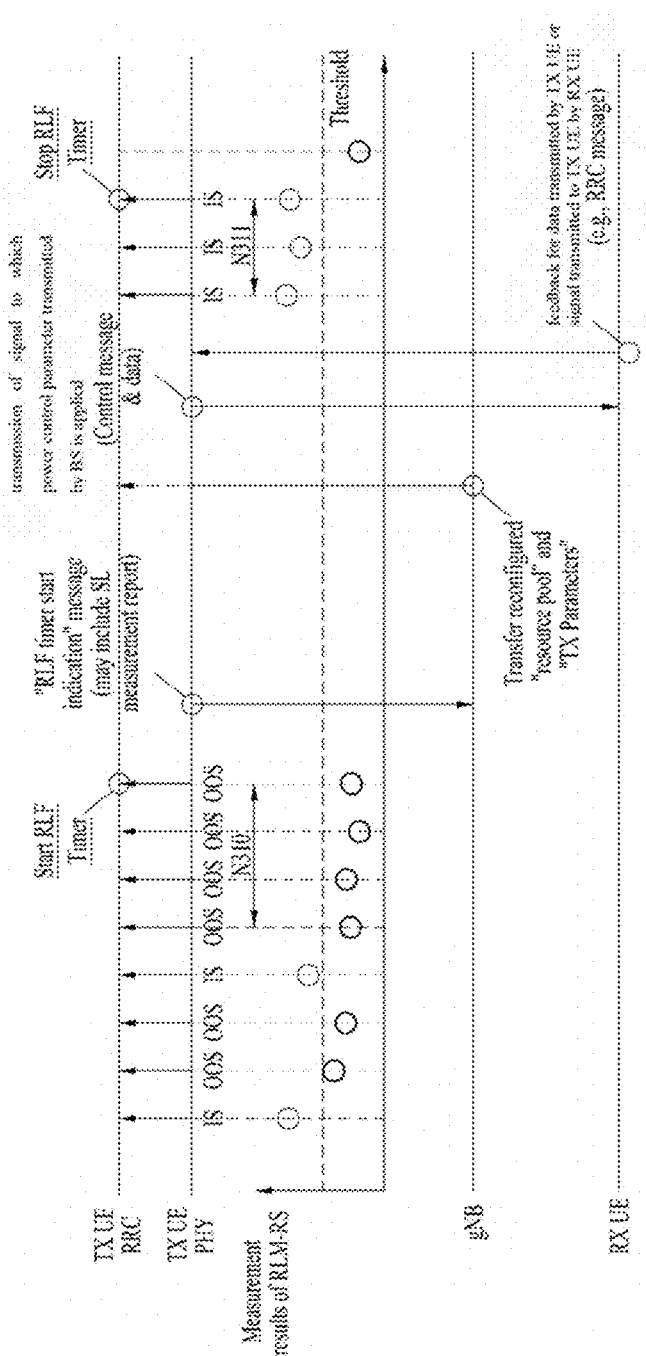

FIG. 17 is a diagram illustrating an embodiment of the above-described proposals.

Referring to FIG. 17, upon detection of consecutive OOS events, a transmitting UE may start an RLF timer and transmit a message indicating that the RLF timer has started to a BS. The transmitting UE may also transmit an SL measurement report to the BS. The BS may reconfigure a resource pool, a power control parameter, or an MCS level based on the RLF timer start indication or the SL measurement report received from the transmitting UE. The transmitting UE may apply the received new resource pool and new transmission parameter (power control parameter, MCS level, or the like) to an SL message (a control PDU or a data PDU) to be transmitted to a receiving UE.

The receiving UE may transmit an HARQ feedback to the transmitting UE on a PSFCH (a feedback channel) associated with a PSSCH (a data transmission channel) of the transmitting UE in the resource pool allocated to the transmitting UE by the BS. Upon detection of consecutive IS events before expiration of the RLF timer, the transmitting UE may stop the RLF timer and perform a normal operation (it may be considered that RLF occurrence has been avoided). Because SL communication is conducted between the transmitting UE and the receiving UE in resources of the resource pool newly reconfigured for the transmitting UE by the BS which has recognized the occurrence of consecutive OOS events in an SL channel, reported by the transmitting UE, the SL communication may be more reliable than the previous SL communication, thereby increasing the probability of IS events.

According to embodiment(s) of the present disclosure, upon detection of consecutive OOS events, the transmitting UE transmits an "occurrence of consecutive OOS events in an SL (PC5 link)" report to the BS, thus indicating an SL channel state, and the BS may configure a new resource pool and a new transmission parameter for SL transmission to the transmitting UE. Therefore, the UEs (the transmitting UE and the receiving UE) may be allowed to conduct SL communication by applying new transmission resources (resources for data transmission, and resources for feedback message transmission) and the new transmission parameter, thereby avoiding RLF declaration.

A method of reconfiguring a PC5 RLM-related parameter for a UE performing PC5 radio link monitoring (PC5 RLM) and indicating the reconfigured PC5 RLM-related parameter to the UE by a BS, and an operation of performing PC5 RLM using the new PC5 RLM parameter received from the BS by the UE will be proposed below. Proposal 3, which will be described later, may be applied together with the above-described Proposal 1 and Proposal 2, if possible.

Proposal 3

When a PC5 radio link state has been changed, the BS may reconfigure an RLM parameter and indicate the reconfigured RLM parameter to the UE.

In the foregoing proposal, upon detection of consecutive OOS events, the UE is configured to start an RLF timer and indicate the occurrence of conductive OOS events (or the start of the RLF timer) to the BS, and the BS is configured to reconfigure a resource pool and a transmission parameter and indicate the reconfigured resource pool and transmission parameter to the UE. The UE is configured to perform SL communication using the resource pool and transmission parameter reconfigured by the BS. Upon occurrence of consecutive IS events before expiration of the RLF timer, the UE is configured to stop the RLF timer. When the RLF timer is stopped, the transmitting UE and the receiving UE may conduct normal SL communication with each other, determining that the PC5 radio link has been recovered or improved.

This proposal proposes that when the PC5 connection is recovered to a normal state by using the resource pool and transmission parameter that the BS has reconfigured and indicated to the UE (e.g., when the UE has started the RLF timer and consecutive IS events have occurred before the RLF timer expires), the BS reconfigures a PC5 RLM parameter and indicates the reconfigured PC5 RLM parameter to the UE.

This proposal proposes that the BS reconfigures the following RLM parameters and indicate the reconfigured RLM parameters to the UE.

RLF timer duration
OOS count N
IS count N
Target block error ratio (BLER) (%)
Maximum number of RLC PDU retransmission failures
Maximum number of "HARQ NACK feedback receptions"
Maximum number of "no feedback receptions"

Upon detection of consecutive OOS events, the UE is configured to start the RLF timer and indicate the occurrence of consecutive OOS events (or the start of the RLF timer) to the BS, and the BS is configured to reconfigure radio resources (a resource pool) and a transmission parameter (a radio control parameter) and indicate the reconfigured resources and transmission parameter to the UE. The UE is configured to perform SL communication using the resource pool and transmission parameter reconfigured by the BS. Upon occurrence of consecutive IS events before expiration of the RLF timer, the UE is configured to stop the RLF timer. The UE may indicate to the BS that the RLF timer has been stopped due to the occurrence of consecutive IS events. This may be considered to be recovery or improvement of the PC5 radio link. Accordingly, the BS may reconfigure a resource pool and a transmission parameter and indicate the reconfigured resource pool and transmission parameter to the UE. When the PC5 link is recovered to a normal state (e.g., when the UE has started the RLF timer and consecutive IS events have occurred before expiration of the RLF timer), the BS may reconfigure a PC5 RLM parameter and indicate the reconfigured PC5 RLM parameter to the UE.

Now, a description will be given of the RLF timer duration.

The RLF timer duration may be a time interval used to declare RLF after RLF detection. When receiving consecutive N OOS primitives from the physical layer in the RRC layer, the UE starts the RLF timer. When the RRC layer of the UE fails to receive N consecutive IS primitives from the physical layer during the RLF timer duration (before expiration of the RLF timer), the UE may declare RLF. When the RRC layer of the UE receives N consecutive IS primitives from the physical layer during the RLF timer duration (before expiration of the RLF timer), the RRC layer of the UE may stop the RLF timer.

For example, the BS may set a larger RLF timer duration than a previous RLF timer duration and indicate the set RLF timer duration to the UE. The BS may allocate new transmission resources and a new transmission parameter to the UE, determining that the PC5 connection has been recovered to the normal state and has become better than before. That is, since the channel state has been improved, the BS may ensure the UE to determine whether RLF has occurred by monitoring occurrence of OOS events and occurrence of IS events for a longer time.

Alternatively, the BS may set a smaller RLF timer duration than the previous RFL timer duration. Therefore, when detecting RLF and activating the RLF timer, the UE may determine whether RLF has occurred by monitoring occurrence of OOS events and occurrence of IS events for a shorter time period than before. This is only one embodiment, and the BS may set the RLF timer duration to various values different from a previous RLF time duration by reflecting a current PC5 radio link state.

The OOS count N will be described below.

The OOS count N may be a threshold used to determine whether to start the RLF timer.

Upon receipt of N (OOS count) consecutive OOS primitives from the physical layer, the RRC layer of the UE may start the RLF timer.

For example, the BS may allocate new transmission resources and a more robust transmission parameter than before to the UE, determining that the PC5 link has been recovered and an SL quality has become better than before. For example, the BS may set a larger OOS count than a previous OOS count and indicate the set OOS count to the UE. That is, in view of the better channel state, the UE may be allowed to determine that the channel state is poor, upon occurrence of more OOS events than before.

Alternatively, the BS may set a smaller OOS count N than the previous OOS count. Therefore, even though the UE detects a smaller number of OOS events, the UE may start the RLF timer. This is merely an embodiment, and the BS may set the OOS count N to various different values from a previous value by reflecting a current PC5 link state.

Further, the present disclosure proposes that the OOS count (threshold "N") is defined as a consecutive N value or "an accumulative number of occurrences per unit time (not the number N of consecutive occurrences)".

N consecutive occurrences
When N consecutive OOS events occur, the RLF time is started.
N accumulative occurrences per unit time
When N accumulative OOS events occur per specific unit time, the RLF timer is started.

The IS count N will be described below.

The IS count N may be a reference used to determine whether to stop the RLF timer.

When the RLF timer starts and N consecutive IS events occur before expiration of the RLF timer, the RLF timer is stopped. On the contrary, when N consecutive IS events do not occur before the expiration of the RLF timer, RLF is declared.

For example, the BS may allocate new transmission resources and a more robust transmission parameter than before to the UE, determining that the PC5 link has been recovered and the SL quality has become better than before. For example, the BS may set a smaller IS count than the previous OOS count and indicate the OOS count to the UE. That is, in view of the better channel state, the UE may be allowed to determine that the PC5 link has been recovered, upon occurrence of fewer IS events than before.

Alternatively, the BS may set a larger IS count N than the previous IS count. This is merely an embodiment, and the BS may set the IS count N to various different values from a previous value by reflecting a current PC5 link state.

Further, the present disclosure proposes that the IS count (threshold "N") is defined as a consecutive N value or "an accumulative number of occurrences per unit time (not the number N of consecutive occurrences)".

N consecutive occurrences

When N consecutive IS events occur before expiration of the RLF timer, the RLF timer is stopped.

N accumulative occurrences per unit time

When N accumulative IS events occur per specific unit time before expiration of the RLF timer, the RLF timer is stopped.

The target BLER (%) will be described below.

The BLER may be a reference for determining OOS in the physical layer. Further, the BLER may be used to measure how much a data transmission is successful.

For example, given a target BLER of 10%, when an error occurs in one out of 10 data transmissions, the UE may determine the PC5 RRC connection to be OOS.

Upon receipt of N (OOS count) consecutive OOS primitives from the physical layer, the RRC layer of the UE may start the RLF timer.

For example, the BS may allocate new transmission resources and a more robust transmission parameter than before to the UE, determining that the PC5 connection has been recovered to the normal state and the SL radio quality has become better than before. For example, the BS may decrease the "target BLER" and indicate the decreased target BLER to the UE (e.g., target BLER 10%→target BLER 5%). That is, in view of the better channel state, a more strict decision condition may be set regarding OOS occurrences.

Alternatively, the BS may decrease the "target BLER" and indicate the decreased target BLER to the UE. This is merely an embodiment, and the BS may set the target BLER to various different values from a previous value by reflecting a current PC5 link state.

The maximum number of RLC PDU retransmission failures will be described below.

The maximum number of RLC PDU retransmission failures may be a maximum allowed number of RLC PDU retransmission failures in an RLC ARQ mode (AM) mode, for use in determining RLF declaration at the UE. That is, upon occurrence of as many RLC PDU retransmission failures as the maximum number of RLC PDU retransmission failures, the UE declares RLF for the PC5 link.

The maximum number of HARQ NACK feedback receptions will be described below.

The maximum number of HARQ NACK feedback receptions may refer to a maximum number of HARQ retransmission failures for use in determining RLF declaration at the transmitting UE. That is, upon receipt of as many HARQ NACKs as the maximum number of HARQ NACK feedback receptions, the UE may declare RLF for the PC5 link.

The maximum "no feedback receptions" will be described below.

The maximum number of no feedback receptions may be a maximum "no feedback reception" count for use in determining RLF declaration at the transmitting UE. That is, when the transmitting UE has failed to receive as many HARQ feedbacks as the maximum number of no feedback receptions, the UE may declare RLF for the PC5 link, According to an embodiment of the present disclosure, in the case where as a BS reconfigures radio resources and a radio control parameter and indicates the reconfigured radio resources and radio control parameter to a UE, and the UE uses the reconfigured radio resources and radio control parameter, a PC5 link has been recovered to a normal state (e.g., although the UE starts an RLF timer, consecutive IS events occur before expiration of the RLF timer and thus the UE stops the RLF timer), the BS reconfigures a PC5 RLM parameter and indicates the reconfigured PC5 RLM parameter to the UE. Accordingly, the UE may monitor the PC5 radio link by using the parameter which has been adapted to an actual channel state by reflecting a changed PC5 link state. That is, even though the PC5 link state changes from time to time, the UE may determine the PC5 radio link well by using an RLM parameter suitable for the changed channel state.

Figure 18:
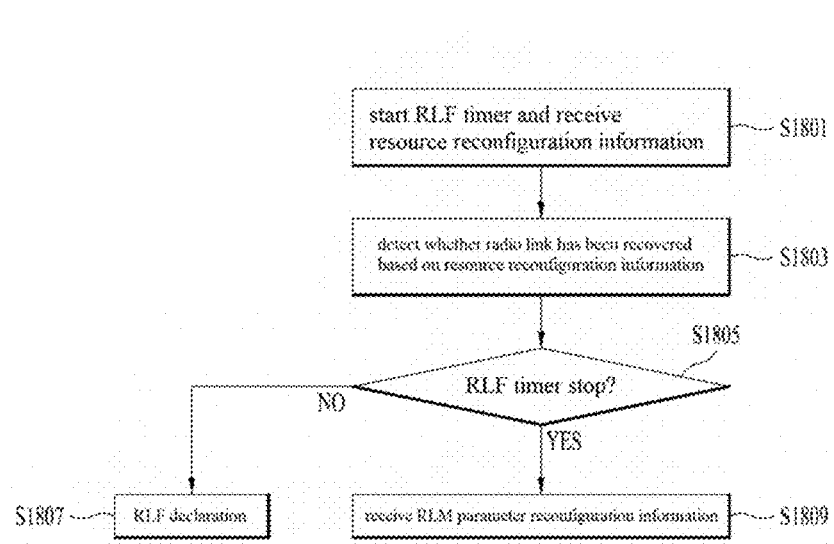

FIG. 18 is a flowchart illustrating embodiment(s) of the present disclosure.

Referring to FIG. 18, upon detection of an 00S state for a radio link (or a PC5 link), a UE may start an RLF timer. In this case, the UE may report information about the start of the RLF timer and receive information (or resource reconfiguration information) about reconfigured resources (or resource pool) and a reconfigured resource control parameter from the BS (S1801). Then, the UE may continuously monitor whether the radio link has been recovered based on the resource reconfiguration information (S1803). When the radio link has been recovered based on the resource reconfiguration information, the UE may stop the RLF timer (S1805), and when the radio link has not been recovered until expiration of the RLF timer, the UE may declare RLF (S1807). When the RLF timer is stopped due to the recovery of the radio link, the UE may report information about the stop of the RLF timer to the BS. Subsequently, the UE may receive RLM parameter reconfiguration information from the BS (S1809). The RLM parameter reconfiguration information may include a reconfigured RLF timer duration, OSS count, IS count, BLER threshold, maximum number of RLC PDU retransmission failures, maximum number of HARQ NACK feedback receptions, and/or maximum number of no feedback receptions. In this case, the UE may reconfigure an RLM (or PC5 RLM) parameter based on the RLM parameter reconfiguration information received from the BS. Therefore, the UE may efficiently monitor the radio link (or PC5 link) by using the RLM (or PC5 RLM) parameter reconfigured adaptively according to the radio link state which has been changed by resource reconfiguration based on the resource reconfiguration information.

Figure 19:
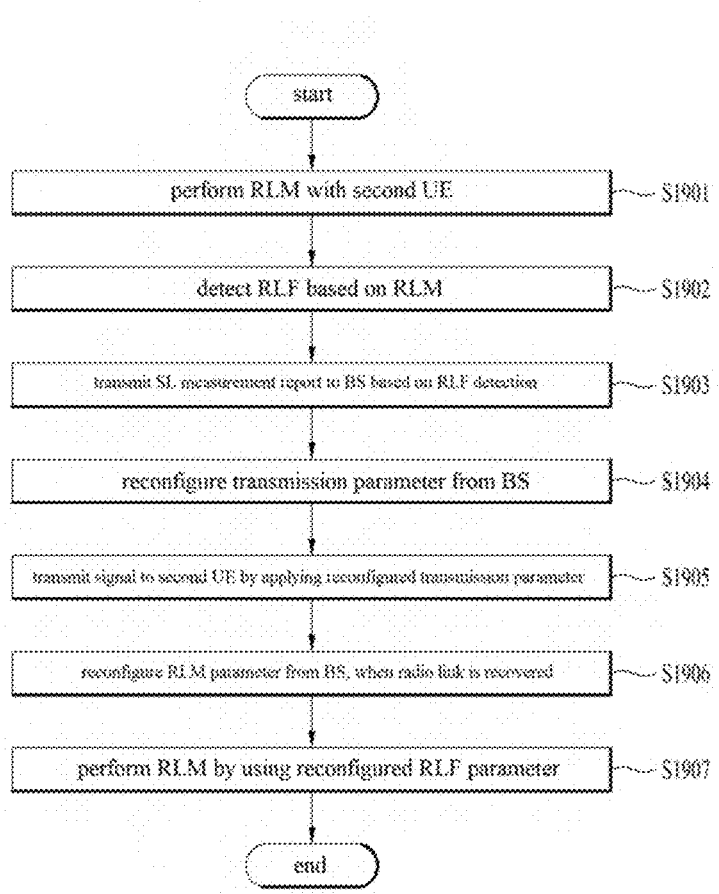

FIG. 19 is a diagram illustrating embodiment(s) of the present disclosure.

In the following description, a first UE may operate as the above-described transmitting UE, and a second UE may operate as the above-described receiving UE.

Referring to FIG. 19, the first UE may monitor a radio link with the second UE (S1901). For example, the first UE may perform RLM by measuring a signal received from the second UE and thus determining OOS or IS. Alternatively, the first UE may perform RLM in consideration of an HARQ feedback for data transmitted to the second UE. For example, when the UE receives an HARQ NACK feedback for the data transmitted to the second UE, the UE may determine OOS. Alternatively, when the UE fails to receive a feedback for the data transmitted to the second UE, the UE may determine OOS.

The first UE may detect RLF based on the RLM (S1902). For example, when the first UE detects as many OOS occurrences as a threshold or OOS occurrences more than the threshold, the first UE may determine that RLF has been detected. The first UE may then start an RLF timer.

The first UE may transmit an SL measurement report to a BS based on the RLF detection (S1903). For example, the SL measurement report may include at least one of an SL RSRP measurement, an SL CSI measurement value, an SL RSRQ measurement value, an SL RSSI measurement value, or a CBR measurement value for an SL resource pool. The SL measurement report may be measured and transmitted to the first UE by the second UE or may be measured by the first UE.

The first UE may be reconfigured with a transmission parameter and an MCS level by the BS (S1904). The BS may receive the SL measurement report from the first UE and reconfigure the transmission parameter and the MCS level in consideration of an SL connection state. Alternatively, when the first UE operates in resource allocation mode 2, the BS may reconfigure a resource pool and indicate the reconfigured resource pool to the first UE.

The first UE may transmit a signal to which the reconfigured transmission parameter and MCS level are applied to the second UE (S1905). For example, when the first UE operates in resource allocation mode 2, the first UE may transmit a signal in the reconfigured resource pool to the second UE. Therefore, as SL communication is conducted by using the transmission parameter, the MCS level, or the resource pool which has been reconfigured in consideration of the radio link state such that OOS may not be detected.

When a radio link is recovered, the first UE may be reconfigured with an RLM parameter by the BS (1906). The RLM parameter may include at least one of an RLM timer duration, an OSS count, an IS count, a target BLER, a maximum number of RLC PDU retransmissions, a maximum number of HARQ NACK feedback receptions, or a maximum number of no HARQ feedback receptions. The first UE may perform RLM by using the reconfigured RLM parameter.

According to the above-described embodiment(s), the UE may be configured with a transmission parameter, an MCS level, a resource pool, or an RLM parameter suitable for an SL connection state. Therefore, the resulting prevention of RLF declaration may lead to reliable SL communication.

It is obvious that each of the examples of the proposed methods may also be included as one of various embodiments of the present disclosure, and thus each example may be regarded as a kind of proposed method. Although the proposed methods may be implemented independently, some of the proposed methods may be combined (or merged) and implemented. The methods proposed in the present disclosure have been described in the context of the 3GPP NR system for convenience of description, the scope of systems to which the proposed methods are applied may be extended to other systems in addition to the 3GPP NR system. For example, the proposed methods of the present disclosure may be extended and applied to D2D communication. Here, D2D communication refers to direct communication between UEs over a radio channel. Although the UE means a user terminal, a network equipment such as a BS may also be regarded as a kind of UE if the network equipment transmits and receives a signal according to UE-to-UE communication schemes. In addition, the proposed methods of the present disclosure may be limitedly applied to MODE 3 V2X operations (and/or MODE 4 V2X operations). For example, the proposed methods of the present disclosure may be limitedly applied to transmission of a preconfigured (and/or signaled) (specific) V2X channel (and/or signal) (e.g., PSSCH (and/or related) PSCCH and/or PSBCH)). For example, the proposed methods of the present disclosure may be limitedly applied when a PSSCH and a PSCCH (related thereto) are transmitted such that they are located to be adjacent (and/or non-adjacent) (in the frequency domain) (and/or when transmission is performed based on the value (and/or range) of a preconfigured (and/or signaled) MCS (coding rate and/or RB). For example, the proposed methods of the present disclosure may be limitedly applied to MODE 3 (and/or MODE 4) V2X carriers (MODE 4 (and/or 3) SL (and/or UL) SPS carriers and/or MODE 4 (and/or 3) dynamic scheduling carriers). Moreover, the proposed methods of the present disclosure may be (limitedly) applied when the positions and/or number of synchronization signal (transmission (and/or reception)) resources (and/or the positions and/or number of subframes in a V2X resource pool (and/or the size and number of subchannels)) are the same (and/or (partially) different) between carriers. For example, the proposed methods of the present disclosure may be extended and applied to (V2X) communication between a BS and a UE. For example, the proposed methods of the present disclosure may be limitedly applied to unicast (SL) communication (and/or multicast (or groupcast) (SL) communication and/or broadcast (SL) communication).

Example of Communication System to which the Present Disclosure is Applied

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 20:
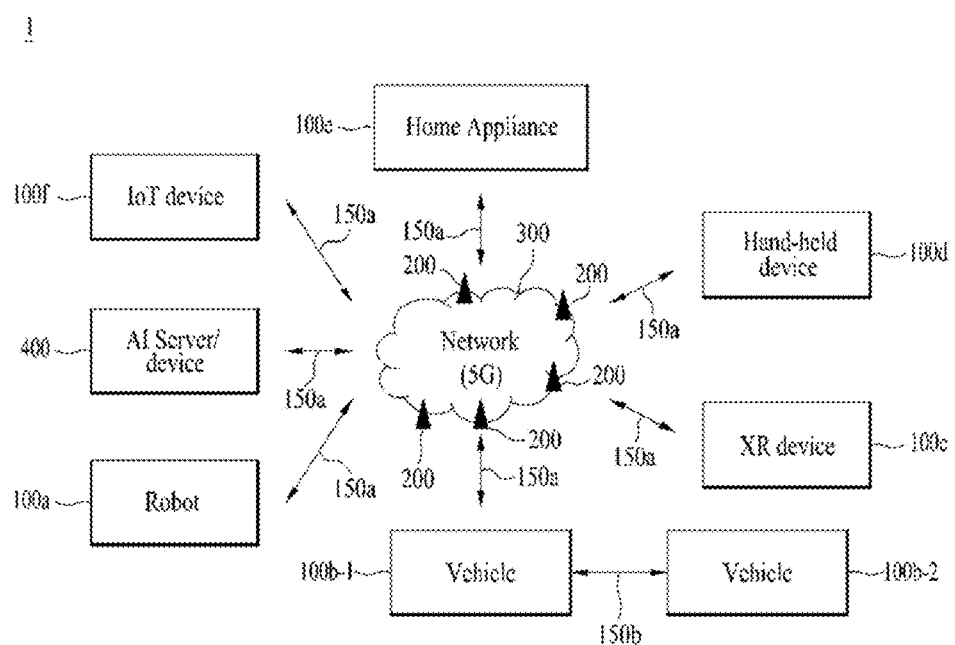
FIGS. 20 to 29 are block diagrams illustrating various devices applicable to embodiment(s) of the present disclosure.

FIG. 20 illustrates a communication system 1 applied to the present disclosure.

Referring to FIG. 20, a communication system applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BS s/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of Wireless Devices to which the Present Disclosure is Applied

Figure 21:
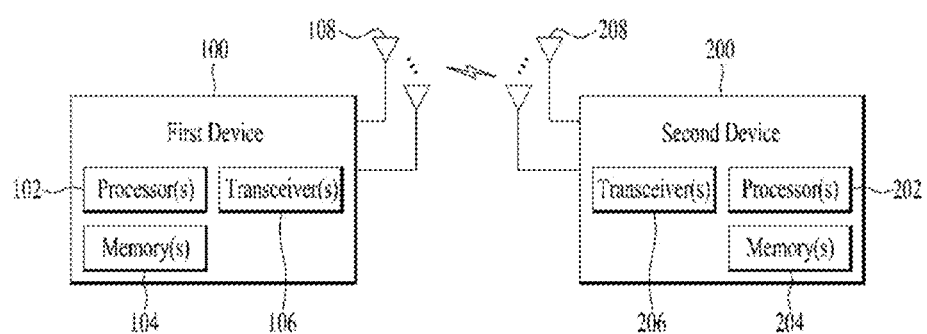

FIG. 21 illustrates wireless devices applicable to the present disclosure.

Referring to FIG. 21, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 20.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Example of a Signal Process Circuit to which the Present Disclosure is Applied

Figure 22:
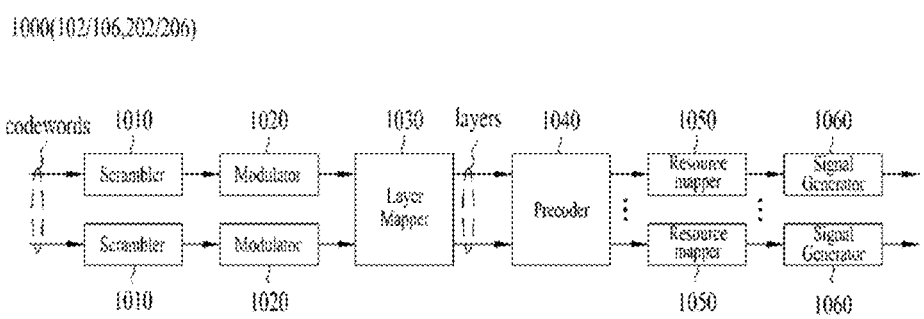

FIG. 22 illustrates a signal process circuit for a transmission signal.

Referring to FIG. 22 a signal processing circuit 1000 may include scramblers 1010, modulators 1020, a layer mapper 1030, a precoder 1040, resource mappers 1050, and signal generators 1060. An operation/function of FIG. 22 may be performed, without being limited to, the processors 102 and 202 and/or the transceivers 106 and 206 of FIG. 21. Hardware elements of FIG. 22 may be implemented by the processors 102 and 202 and/or the transceivers 106 and 206 of FIG. 21. For example, blocks 1010 to 1060 may be implemented by the processors 102 and 202 of FIG. 21. Alternatively, the blocks 1010 to 1050 may be implemented by the processors 102 and 202 of FIG. 21 and the block 1060 may be implemented by the transceivers 106 and 206 of FIG. 21.

Codewords may be converted into radio signals via the signal processing circuit 1000 of FIG. 22. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 22. For example, the wireless devices (e.g., 100 and 200 of FIG. 21) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 23:
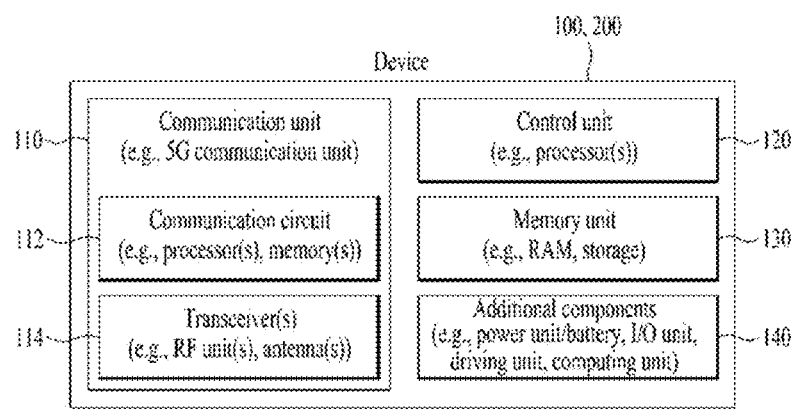

Application Example of a Wireless Device to which the Present Disclosure is Applied FIG. 23 illustrates another example of a wireless device applied to the present disclosure. The wireless device may be implemented in various forms according to a use-case/service.

Referring to FIG. 23, wireless devices 100 and 200 may correspond to the wireless devices 100 and 200 of FIG. 21 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 21. For example, the transceiver(s) 114 may include the one or more transceivers 106 and 206 and/or the one or more antennas 108 and 208 of FIG. 21. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 20), the vehicles (100b-1 and 100b-2 of FIG. 20), the XR device (100c of FIG. 20), the hand-held device (100d of FIG. 20), the home appliance (100e of FIG. 20), the IoT device (100f of FIG. 20), a digital broadcast terminal, a hologram device, a public safety device, an MTC device, a medicine device, a fintech device (or a finance device), a security device, a climate/environment device, the AI server/device (400 of FIG. 20), the BSs (200 of FIG. 20), a network node, etc. The wireless device may be used in a mobile or fixed place according to a use-example/service.

In FIG. 23, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 23 will be described in detail with reference to the drawings.

Example of Hand-Held Device to which the Present Disclosure is Applied

Figure 24:
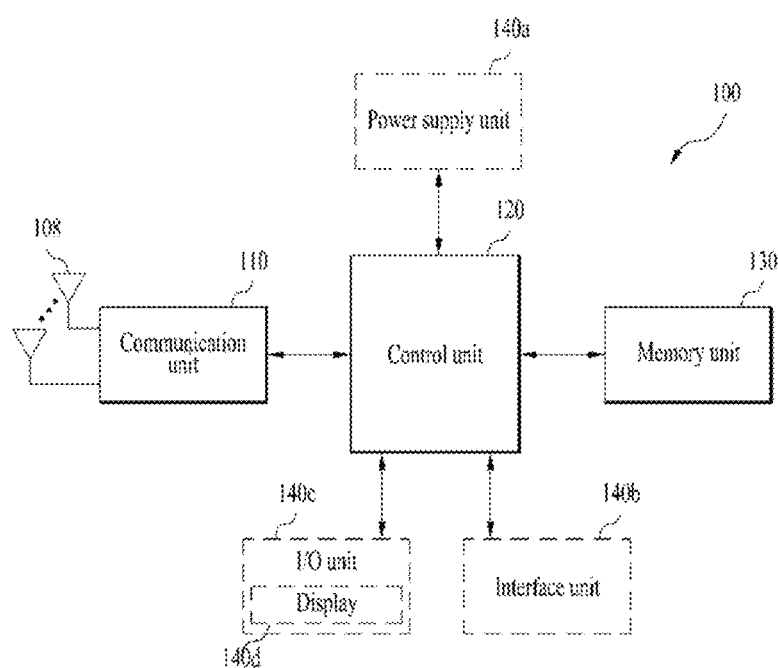

FIG. 24 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 24, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 23, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 25:
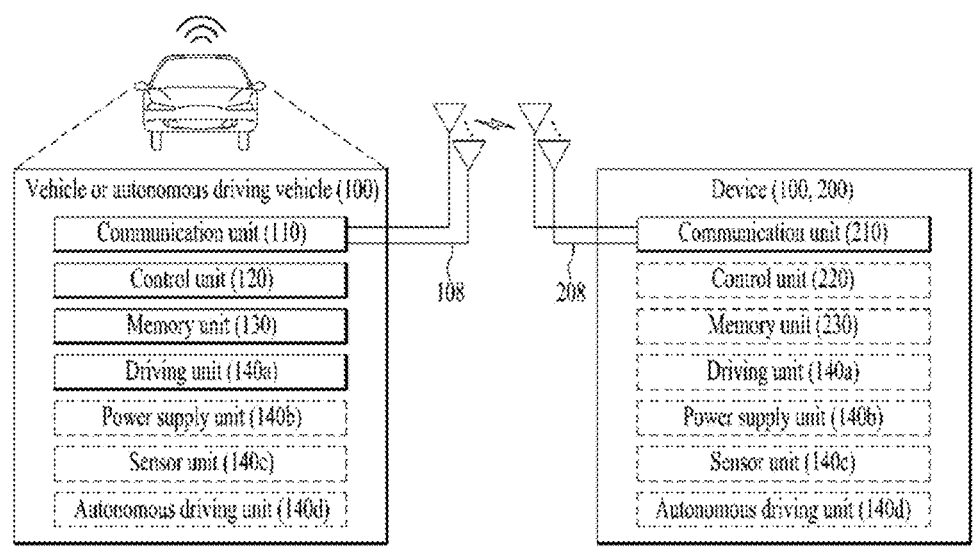

Example of a Vehicle or an Autonomous Driving Vehicle to which the Present Disclosure is Applied FIG. 25 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 25, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 23, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Examples of AR/VR and Vehicle to which the Present Disclosure is Applied

Figure 26:
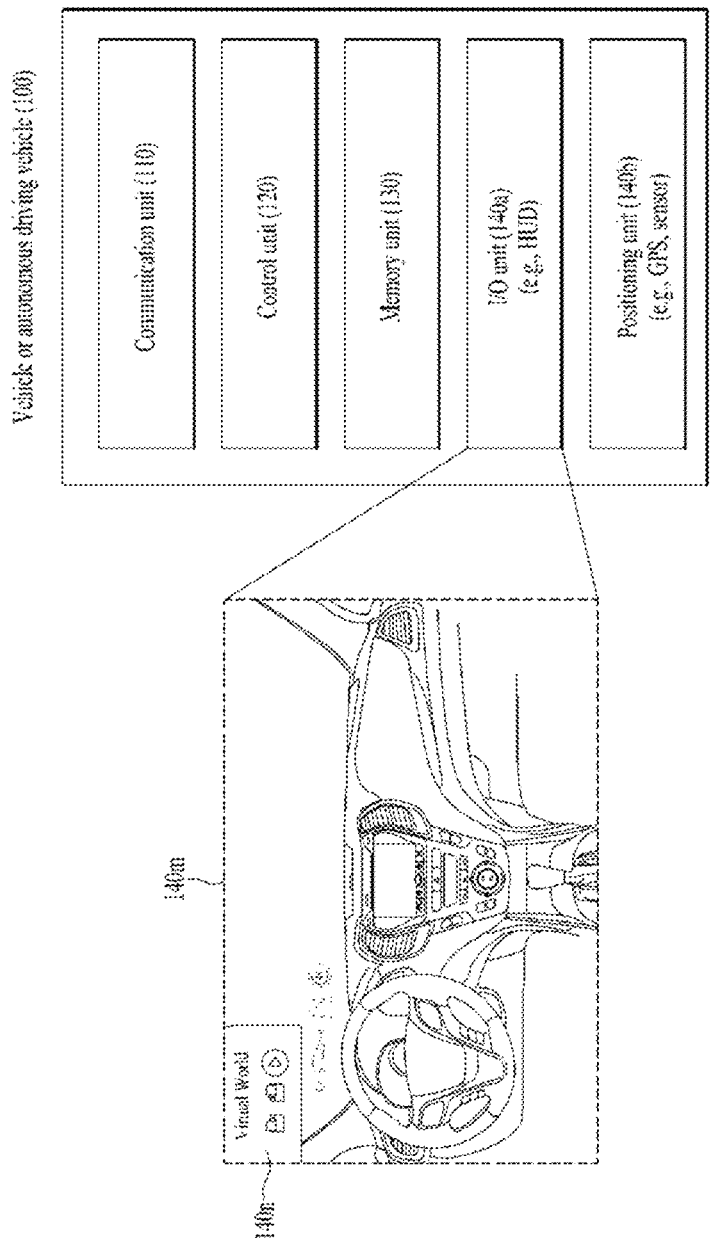

FIG. 26 illustrates a vehicle applied to the present disclosure. The vehicle may be implemented as a transport means, an aerial vehicle, a ship, etc.

Referring to FIG. 26, a vehicle 100 may include a communication unit 110, a control unit 120, a memory unit 130, an I/O unit 140a, and a positioning unit 140b. Herein, the blocks 110 to 130/140a and 140b correspond to blocks 110 to 130/140 of FIG. 23.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140a may output an AR/VR object based on information within the memory unit 130. The I/O unit 140a may include an HUD. The positioning unit 140b may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140*b* may include a GPS and various sensors.

As an example, the communication unit 110 of the vehicle 100 may receive map information and traffic information from an external server and store the received information in the memory unit 130. The positioning unit 140*b* may obtain the vehicle position information through the GPS and various sensors and store the obtained information in the memory unit 130. The control unit 120 may generate a virtual object based on the map information, traffic information, and vehicle position information and the I/O unit 140*a* may display the generated virtual object in a window in the vehicle (1410 and 1420). The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140*a*. In addition, the control unit 120 may broadcast a warning message regarding driving abnormality to neighboring vehicles through the communication unit 110. According to situation, the control unit 120 may transmit the vehicle position information and the information about driving/vehicle abnormality to related organizations.

Examples of XR Device to which the Present Disclosure is Applied

Figure 27:
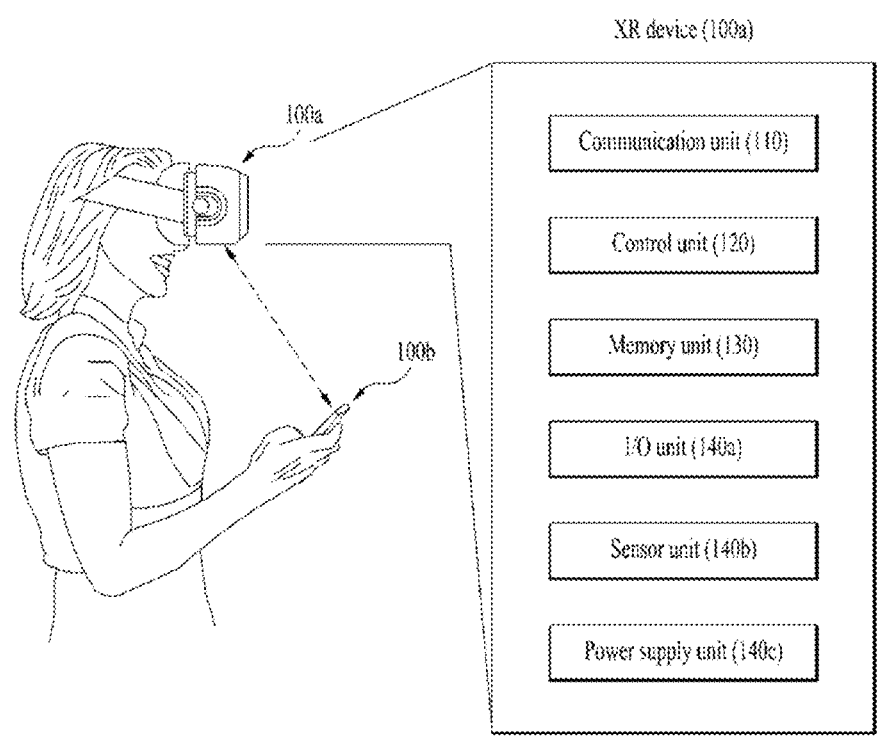

FIG. 27 illustrates an XR device applied to the present disclosure. The XR device may be implemented by an HMD, an HUD mounted in a vehicle, a television, a smartphone, a computer, a wearable device, a home appliance, a digital signage, a vehicle, a robot, etc.

Referring to FIG. 27, an XR device 100*a* may include a communication unit 110, a control unit 120, a memory unit 130, an I/O unit 140*a*, a sensor unit 140*b*, and a power supply unit 140*c*. Herein, the blocks 110 to 130/140*a* to 140*c* correspond to the blocks 110 to 130/140 of FIG. 23, respectively.

The communication unit 110 may transmit and receive signals (e.g., media data and control signals) to and from external devices such as other wireless devices, hand-held devices, or media servers. The media data may include video, images, and sound. The control unit 120 may perform various operations by controlling constituent elements of the XR device 100*a*. For example, the control unit 120 may be configured to control and/or perform procedures such as video/image acquisition, (video/image) encoding, and metadata generation and processing. The memory unit 130 may store data/parameters/programs/code/commands needed to drive the XR device 100*a*/generate XR object. The I/O unit 140*a* may obtain control information and data from the exterior and output the generated XR object. The I/O unit 140*a* may include a camera, a microphone, a user input unit, a display unit, a speaker, and/or a haptic module. The sensor unit 140*b* may obtain an XR device state, surrounding environment information, user information, etc. The sensor unit 140*b* may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit 140*c* may supply power to the XR device 100*a* and include a wired/wireless charging circuit, a battery, etc.

For example, the memory unit 130 of the XR device 100*a* may include information (e.g., data) needed to generate the XR object (e.g., an AR/VR/MR object). The I/O unit 140*a* may receive a command for manipulating the XR device 100*a* from a user and the control unit 120 may drive the XR device 100*a* according to a driving command of a user. For example, when a user desires to watch a film or news through the XR device 100*a*, the control unit 120 transmits content request information to another device (e.g., a hand-held device 100*b*) or a media server through the communication unit 130. The communication unit 130 may download/stream content such as films or news from another device (e.g., the hand-held device 100*b*) or the media server to the memory unit 130. The control unit 120 may control and/or perform procedures such as video/image acquisition, (video/image) encoding, and metadata generation/processing with respect to the content and generate/output the XR object based on information about a surrounding space or a real object obtained through the I/O unit 140*a*/sensor unit 140*b*.

The XR device 100*a* may be wirelessly connected to the hand-held device 100*b* through the communication unit 110 and the operation of the XR device 100*a* may be controlled by the hand-held device 100*b*. For example, the hand-held device 100*b* may operate as a controller of the XR device 100*a*. To this end, the XR device 100*a* may obtain information about a 3D position of the hand-held device 100*b* and generate and output an XR object corresponding to the hand-held device 100*b*.

Examples of Robot to which the Present Disclosure is Applied

Figure 28:
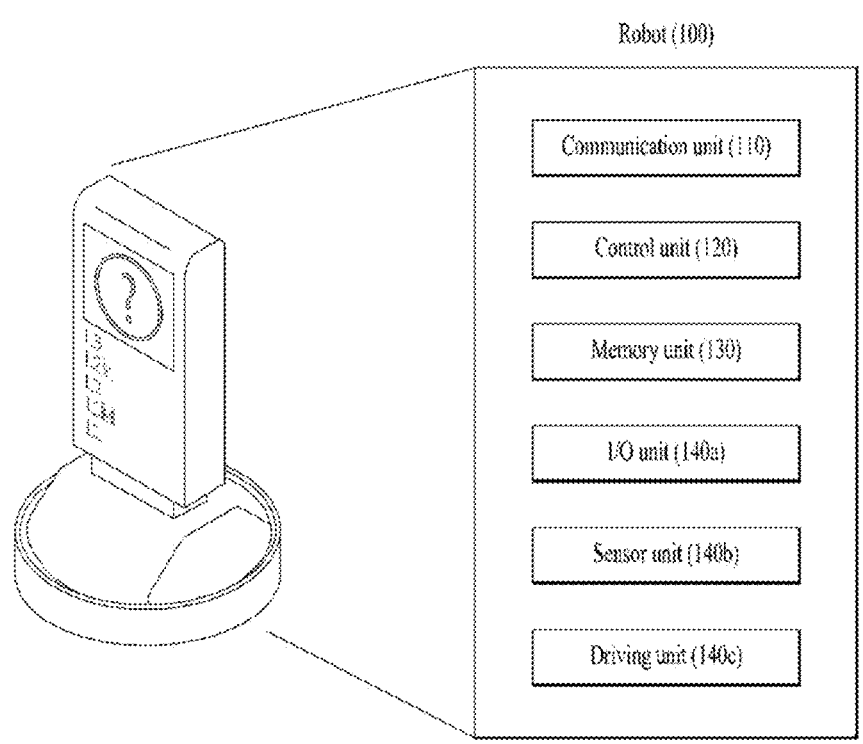

FIG. 28 illustrates a robot applied to the present disclosure. The robot may be categorized into an industrial robot, a medical robot, a household robot, a military robot, etc., according to a used purpose or field.

Referring to FIG. 28, a robot 100 may include a communication unit 110, a control unit 120, a memory unit 130, an I/O unit 140*a*, a sensor unit 140*b*, and a driving unit 140*c*.

The communication unit 110 may transmit and receive signals (e.g., driving information and control signals) to and from external devices such as other wireless devices, other robots, or control servers. The control unit 120 may perform various operations by controlling constituent elements of the robot 100. The memory unit 130 may store data/parameters/programs/code/commands for supporting various functions of the robot 100. The I/O unit 140*a* may obtain information from the exterior of the robot 100 and output information to the exterior of the robot 100. The I/O unit 140*a* may include a camera, a microphone, a user input unit, a display unit, a speaker, and/or a haptic module. The sensor unit 140*b* may obtain internal information of the robot 100, surrounding environment information, user information, etc. The sensor unit 140*b* may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit 140*c* may perform various physical operations such as movement of robot joints. In addition, the driving unit 140*c* may cause the robot 100 to travel on the road or to fly. The driving unit 140*c* may include an actuator, a motor, a wheel, a brake, a propeller, etc.

Examples of AI Device to which the Present Disclosure is Applied

Figure 29:
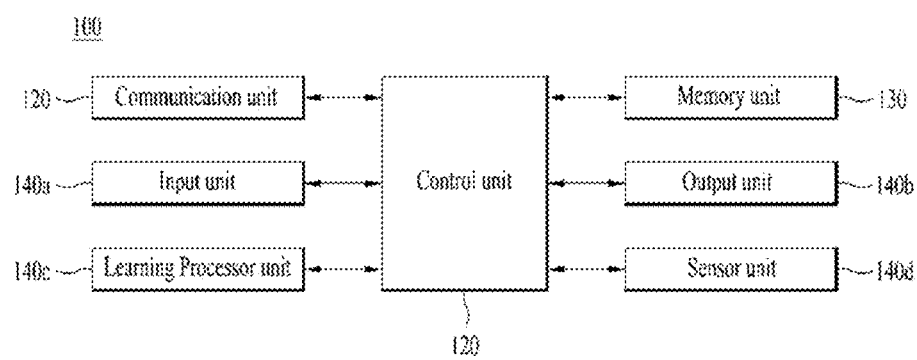

FIG. 29 illustrates an AI device applied to the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, etc.

Referring to FIG. 29, an AI device 100 may include a communication unit 110, a control unit 120, a memory unit 130, an I/O unit 140a/140b, a learning processor unit 140c, and a sensor unit 140d. The blocks 110 to 130/140a to 140d correspond to blocks 110 to 130/140 of FIG. 23, respectively.

The communication unit 110 may transmit and receive wired/radio signals (e.g., sensor information, user input, learning models, or control signals) to and from external devices such as other AI devices (e.g., 100x, 200, or 400 of FIG. 20) or an AI server (e.g., 400 of FIG. 20) using wired/wireless communication technology. To this end, the communication unit 110 may transmit information within the memory unit 130 to an external device and transmit a signal received from the external device to the memory unit 130.

The control unit 120 may determine at least one feasible operation of the AI device 100, based on information which is determined or generated using a data analysis algorithm or a machine learning algorithm. The control unit 120 may perform an operation determined by controlling constituent elements of the AI device 100. For example, the control unit 120 may request, search, receive, or use data of the learning processor unit 140c or the memory unit 130 and control the constituent elements of the AI device 100 to perform a predicted operation or an operation determined to be preferred among at least one feasible operation. The control unit 120 may collect history information including the operation contents of the AI device 100 and operation feedback by a user and store the collected information in the memory unit 130 or the learning processor unit 140c or transmit the collected information to an external device such as an AI server (400 of FIG. 20). The collected history information may be used to update a learning model.

The memory unit 130 may store data for supporting various functions of the AI device 100. For example, the memory unit 130 may store data obtained from the input unit 140a, data obtained from the communication unit 110, output data of the learning processor unit 140c, and data obtained from the sensor unit 140. The memory unit 130 may store control information and/or software code needed to operate/drive the control unit 120.

The input unit 140a may acquire various types of data from the exterior of the AI device 100. For example, the input unit 140a may acquire learning data for model learning, and input data to which the learning model is to be applied. The input unit 140a may include a camera, a microphone, and/or a user input unit. The output unit 140b may generate output related to a visual, auditory, or tactile sense. The output unit 140b may include a display unit, a speaker, and/or a haptic module. The sensing unit 140 may obtain at least one of internal information of the AI device 100, surrounding environment information of the AI device 100, and user information, using various sensors. The sensor unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit 140c may learn a model consisting of artificial neural networks, using learning data. The learning processor unit 140c may perform AI processing together with the learning processor unit of the AI server. The learning processor unit 140c may process information received from an external device through the communication unit 110 and/or information stored in the memory unit 130. In addition, an output value of the learning processor unit 140c may be transmitted to the external device through the communication unit 110 and may be stored in the memory unit 130.

INDUSTRIAL APPLICABILITY

The above-described embodiments of the present disclosure are applicable to various mobile communication systems.

The invention claimed is:

1. A method of performing an operation for a first user equipment (UE) in a wireless communication system, the method comprising:
monitoring, by the first UE, a radio link related to a second UE; and
based on detecting a radio link failure (RLF) on the radio link, starting a RLF timer and attempting to recover the radio link; and
wherein the detecting the RLF on the radio link comprises:
based on a number of consecutive out-of-sync (OOS) primitives received from a lower layer being equal to a first OOS counter, considering that the RLF is detected on the radio link;
wherein the attempting to recover the radio link comprises:
transmitting, to a base station, a radio link measurement report; and
receiving, from the base station, information about at least one reconfigured transmission parameter; and
transmitting, to the second UE, a signal to which the at least one reconfigured transmission parameter is applied,
wherein, based on the radio link being recovered before an expiration of the RLF timer, at least one reconfigured radio link monitoring parameter is received from the base station and the radio link is monitored based on the at least one reconfigured radio link monitoring parameters
wherein the at least one reconfigured radio link monitoring parameter includes a second OOS counter determined based on the radio link measurement report.

2. The method according to claim 1, wherein the at least one reconfigured transmission parameter includes at least one of a modulation and coding scheme (MCS) level, a pathloss compensation factor, or a maximum transmission power.

3. The method according to claim 1, further comprising: based on detecting the RLF on the radio link, receiving, from the base station, information on a reconfigured resource pool related to the radio link.

4. The method according to claim 3, wherein the signal is transmitted on at least one resource selected from the reconfigured resource pool.

5. The method according to claim 1, wherein the radio link measurement report is received from the second UE or generated by the first UE.

6. The method according to claim 1, wherein the at least one reconfigured radio link monitoring parameter includes at least one of an RLF timer duration, an out-of-sync count, an in-sync count, a target block error rate (BLER), a maximum number of radio link control protocol data unit (RLC PDU) retransmissions, a maximum number of hybrid automatic repeat request (HARQ) negative acknowledgement (NACK) feedback receptions, or a maximum number of no feedback receptions.

7. A first user equipment (UE) in a wireless communication system, the first UE comprising:
at least one processor; and
at least one computer memory operably coupled to the at least one processor and storing instructions which when executed, cause the at least one processor to perform operations, wherein the operations include:
monitoring, by the first UE, a radio link related to a second UE; and
based on detecting a radio link failure (RLF) on the radio link, starting a RLF timer and attempting to recover the radio link; and
wherein the detecting the RLF on the radio link comprises:
based on a number of consecutive out-of-sync (OOS) primitives received from a lower layer being equal to a first OOS counter, considering that the RLF is detected on the radio link;
wherein the attempting to recover the radio link comprises:
transmitting, to a base station, a radio link measurement report; and
receiving, from the base station, information about at least one reconfigured transmission parameter; and
transmitting, to the second UE, a signal to which the at least one reconfigured transmission parameter is applied,
wherein, based on the radio link being recovered before an expiration of the RLF timer, at least one reconfigured radio link monitoring parameter is received from the base station and the radio link is monitored based on the at least one reconfigured radio link monitoring parameters
wherein the at least one reconfigured radio link monitoring parameter includes a second OOS counter determined based on the radio link measurement report.

8. A processor comprising circuitry and memory for performing operations for a first user equipment (UE) in a wireless communication system, wherein the operations include:
monitoring, by the first UE, a radio link related to a second UE; and
based on detecting a radio link failure (RLF) on the radio link, starting a RLF timer and attempting to recover the radio link; and
wherein the detecting the RLF on the radio link comprises:
based on a number of consecutive out-of-sync (OOS) primitives received from a lower layer being equal to a first OOS counter, considering that the RLF is detected on the radio link;
wherein the attempting to recover the radio link comprises: transmitting, to a base station, a radio link measurement report; and
receiving, from the base station, information about at least one reconfigured transmission parameter; and
transmitting, to the second UE, a signal to which the at least one reconfigured transmission parameter is applied,
wherein, based on the radio link being recovered before an expiration of the RLF timer, at least one reconfigured radio link monitoring parameter is received from the base station and the radio link is monitored based on the at least one reconfigured radio link monitoring parameters
wherein the at least one reconfigured radio link monitoring parameter includes a second OOS counter determined based on the radio link measurement report.

9. A non-transitory computer-readable storage medium storing at least one program including instructions which when executed by at least one processor of a first user equipment (UE), causes the at least one processor to perform operations, wherein the operations include:
monitoring, by the first UE, a radio link related to a second UE; and
based on detecting a radio link failure (RLF) on the radio link, starting a RLF timer and attempting to recover the radio link; and
wherein the detecting the RLF on the radio link comprises:
based on a number of consecutive out-of-sync (OOS) primitives received from a lower layer being equal to a first OOS counter, considering that the RLF is detected on the radio link;
wherein the attempting to recover the radio link comprises:
transmitting, to a base station, a radio link measurement report; and
receiving, from the base station, information about at least one reconfigured transmission parameter; and
transmitting, to the second UE, a signal to which the at least one reconfigured transmission parameter is applied,
wherein, based on the radio link being recovered before an expiration of the RLF timer, at least one reconfigured radio link monitoring parameter is received from the base station and the radio link is monitored based on the at least one reconfigured radio link monitoring parameters
wherein the at least one reconfigured radio link monitoring parameter includes a second OOS counter determined based on the radio link measurement report.

10. The first UE according to claim 7, wherein the first UE communicates with at least one of another UE, a UE related to an autonomous driving vehicle, a base station, or a network.

* * * * *